(12) United States Patent
Sugaya

(10) Patent No.: US 10,716,138 B2
(45) Date of Patent: Jul. 14, 2020

(54) COMMUNICATION APPARATUS, COMMUNICATION METHOD, AND PROGRAM

(71) Applicant: SONY CORPORATION, Tokyo (JP)

(72) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/075,461

(22) PCT Filed: Feb. 22, 2017

(86) PCT No.: PCT/JP2017/006500
§ 371 (c)(1),
(2) Date: Aug. 3, 2018

(87) PCT Pub. No.: WO2017/179303
PCT Pub. Date: Oct. 19, 2017

(65) Prior Publication Data
US 2019/0045538 A1    Feb. 7, 2019

(30) Foreign Application Priority Data

Apr. 13, 2016 (JP) ................................ 2016-080027

(51) Int. Cl.
*H04W 74/04* (2009.01)
*H04L 29/06* (2006.01)
(Continued)

(52) U.S. Cl.
CPC .......... *H04W 74/04* (2013.01); *H04L 5/0055* (2013.01); *H04L 69/22* (2013.01); *H04W 40/20* (2013.01);
(Continued)

(58) Field of Classification Search
CPC . H04W 40/20; H04W 72/04; H04W 72/0446; H04W 74/04; H04W 76/30;
(Continued)

(56) References Cited

U.S. PATENT DOCUMENTS 8,031,661 B2 * 10/2011 Wentink ............. H04N 21/4126
370/329
8,270,385 B2 * 9/2012 Wentink ............. H04N 21/4126
370/338
(Continued)

FOREIGN PATENT DOCUMENTS

| JP | 5210887 B2 | 6/2013 |
| JP | 2015-521427 A | 7/2015 |
| WO | 2007082229 A2 | 7/2007 |

OTHER PUBLICATIONS

Extended Search Report issued in European Application 17782121.2-1215 dated Dec. 14, 2018.
(Continued)

*Primary Examiner* — Tri H Phan
(74) *Attorney, Agent, or Firm* — Xsensus LLP

(57) ABSTRACT

[Object] To provide a mechanism capable of preventing communication collision while suppressing a reduction in the opportunities to access the transmission path.
[Solution] A communication device, including: a processing unit configured to generate a second frame used for releasing a stop of transmission of a frame caused by a first frame, the second frame including first destination information specifying a destination stored in the first frame, the first frame being used for stopping transmission of frames of communication devices other than the destination and serving as a response to a communication request; and a wireless communication unit configured to transmit the second frame. A communication device, including: a wireless communication unit configured to receive a second frame used for
(Continued)

releasing a stop of transmission of a frame caused by a first frame, the second frame including first destination information specifying a destination stored in the first frame, the first frame being used for stopping transmission of frames of communication devices other than the destination and serving as a response to a communication request; and a control unit configured to control transmission of a frame on a basis of the second frame received by the wireless communication unit.

15 Claims, 29 Drawing Sheets

(51) Int. Cl.
*H04L 5/00* (2006.01)
*H04W 40/20* (2009.01)
*H04W 72/04* (2009.01)
*H04W 76/30* (2018.01)
*H04W 84/12* (2009.01)

(52) U.S. Cl.
CPC ....... *H04W 72/0446* (2013.01); *H04W 76/30* (2018.02); *H04W 84/12* (2013.01)

(58) Field of Classification Search
CPC ........ H04W 84/12; H04L 5/00; H04L 5/0055; H04L 29/06; H04L 69/22
See application file for complete search history.

(56) References Cited

U.S. PATENT DOCUMENTS

| | | | |
|---|---|---|---|
| 8,359,065 B2* | 1/2013 | Grandhi | H04W 74/002 455/552.1 |
| 9,144,088 B2* | 9/2015 | Seok | H04W 74/04 |
| 9,179,449 B2* | 11/2015 | Asterjadhi | H04W 72/0406 |
| 9,793,975 B2* | 10/2017 | Zhang | H04W 52/0216 |
| 9,860,785 B2* | 1/2018 | Asterjadhi | H04W 28/06 |
| 9,894,652 B2* | 2/2018 | Seok | H04W 74/04 |
| 10,154,482 B2* | 12/2018 | Kim | H04W 72/04 |
| 10,349,445 B2* | 7/2019 | Kim | H04W 12/06 |
| 10,524,231 B2* | 12/2019 | Kim | H04W 84/12 |
| 2013/0301523 A1 | 11/2013 | Asterjadhi et al. | |
| 2014/0036772 A1 | 2/2014 | Asterjadhi et al. | |

OTHER PUBLICATIONS

Schelstraete, S., "Multiple NAVs for Spatial Reuse", IEEE Draft, vol. 802.11ax, pp. 1-11, (Nov. 9, 2015).
International Search Report dated May 16, 2017, in PCT/JP2017/006500 filed Feb. 22, 2017.
Khorov, E., "Multiple NAVs for Spatial Reuse", doc.: IEEE 802.11-15/1348, 2015, 11 pages.

* cited by examiner

FIG. 2

| Frame Control | Duration | RA | TA | FCS |
|---|---|---|---|---|

FIG. 3

| Frame Control | Duration | RA(CTS) | FCS |
|---|---|---|---|

FIG. 4

| Frame Control | Duration | RA(Ack) | FCS |
|---|---|---|---|

FIG. 6

| Frame Control | Duration | RA (BC) | BSSID (TA) | FCS |
|---|---|---|---|---|
|  | 0x00 |  |  |  |

FIG. 15

| Frame Control | CF-End Type<br>0x01 | CTS RA | BSSID (TA) | FCS |
|---|---|---|---|---|

FIG. 16

| Frame Control | CF-End Type | RA | BSSID | CTS RA | FCS |
| | 0x02 | (BC) | (TA) | | |

FIG. 22

| Frame Control | CF-End Type | ACK RA | BSSID | FCS |
|---|---|---|---|---|
| | 0x03 | | (TA) | |

FIG. 23

| Frame Control | CF-End Type | RA (BC) | BSSID (TA) | ACK RA | FCS |
|---|---|---|---|---|---|
| | 0x04 | | | | |

FIG. 24

| Frame Control | CF-End Type 0x05 | RA (BC) | BSSID (TA) | ACK RA1 | ... | ACK RAn | FCS |

COMMUNICATION APPARATUS, COMMUNICATION METHOD, AND PROGRAM

TECHNICAL FIELD

The present disclosure relates to a communication device, a communication method and a program.

BACKGROUND ART

In recent years, wireless local area networks (LANs) representative of Institute of Electrical and Electronics Engineers (IEEE) 802.11 have been widely used. In addition, the number of wireless LAN-compatible products (hereinafter, also referred to as wireless communication devices) have also increased in accordance with this. In contrast, wireless communication resources available for communication are limited. Therefore, it is desirable to increase the efficiency of communication between wireless communication devices.

As an example of a technique for improving communication efficiency, a technique called virtual carrier sensing is known. Specifically, a technique for controlling a network allocation vector (NAV) using a mechanism such as request to send (RTS)/clear to send (CTS) is known. For example, a transmission device that desires data transmission transmits an RTS frame to a reception device which is a destination of data transmission, and the reception device transmits a CTS frame to the transmission device in a case in which data transmission is permitted. At this time, communication devices other than destinations of the RTS frame and the CTS frame set a NAV and stop data transmission during a NAV period. Accordingly, it is considered that communication collision is avoided, and communication can be performed efficiently as a result.

Here, there is a mechanism of releasing the NAV before the NAV period ends. For example, in a case in which communication using the RTS and the CTS is performed between an access point (AP) and a station (STA), the AP can release the set NAV by transmitting a contention free (CF)-end frame. Further, in the CF-End frame, a broadcast address is stored as destination information, and a basic service set identifier (BSSID) is stored as transmission source information.

However, in the mechanism where the NAV is released before the NAV period ends, unfairness may arise in terms of opportunities to access a transmission path. For example, the communication device that has received the CF-End frame can release the NAV and start communication, but the communication device which has not received the CF-End frame is unable to perform communication until the NAV period ends since the NAV remains set.

On the other hand, a method in which the STA transmits a first disconnection process frame including a CF-End frame for disconnecting a transmission opportunity (TXOP) set around the STA, and the AP which has received the first disconnection process frame transmits a second disconnection frame including a CF-End frame for disconnecting the TXOP set around the AP is disclosed in Patent Literature 1.

CITATION LIST

Patent Literature

Patent Literature 1: JP 5210887B

DISCLOSURE OF INVENTION

Technical Problem

However, in the technique disclosed in Patent Literature 1, the unfairness regarding the opportunities to access the transmission path is unlikely to be solved. For example, since the transmission source information is not stored in the CTS frame, the communication device which has received only the CTS frame does not know the BSSID corresponding to the set NAV. For this reason, even though the CF-End frame is received, the communication device is unable to determine whether or not the BSSID stored in the CF-End frame is the BSSID corresponding to the set NAV. Therefore, is a case in which the BSSID stored in the CF-End frame coincides with the BSSID corresponding to the set NAV, when the NAV is not released, the opportunities for the communication device to access the transmission path decease. On the other hand, in a case in which the BSSID stored in the CF-End frame does not coincide with the BSSID corresponding to the set NAV when the NAV is released, communication collision is likely to occur.

In this regard, the present disclosure proposes a mechanism capable of preventing communication collision while suppressing a reduction in the opportunities to access the transmission path.

Solution to Problem

According to the present disclosure, there is provided a communication device, including: a processing unit configured to generate a second frame used for releasing a stop of transmission of a frame caused by a first frame, the second frame including first destination information specifying a destination stored in the first frame, the first frame being used for stopping transmission of frames of communication devices other than the destination and serving as a response to a communication request; and a wireless communication unit configured to transmit the second frame.

In addition, according to the present disclosure, there is provided a communication device, including: a wireless communication unit configured to receive a second frame used for releasing a stop of transmission of a frame caused by a first frame, the second frame including first destination information specifying a destination stored in the first frame, the first frame being used for stopping transmission of frames of communication devices other than the destination and serving as a response to a communication request; and a control unit configured to control transmission of a frame on a basis of the second frame received by the wireless communication unit.

In addition, according to the present disclosure, there is provided a communication method, including: generating a second frame used for releasing a stop of transmission of a frame caused by a first frame using a processor, the second frame including first destination information specifying a destination stored in the first frame, the first frame being used for stopping transmission of frames of communication devices other than the destination and serving as a response to a communication request; and transmitting the second frame.

In addition, according to the present disclosure, there is provided a communication method, including: receiving a second frame used for releasing a stop of transmission of a frame caused by a first frame using a processor, the second frame including first destination information specifying a destination stored in the first frame, the first frame being used for stopping transmission of frames of communication devices other than the destination and serving as a response to a communication request; and controlling transmission of a frame on a basis of the received second frame.

In addition, according to the present disclosure, there is provided a program causing a computer to implement: a processing function of generating a second frame used for releasing a stop of transmission of a frame caused by a first frame, the second frame including first destination information specifying a destination stored in the first frame, the first frame being used for stopping transmission of frames of communication devices other than the destination and serving as a response to a communication request; and a wireless communication function of transmitting the second frame.

In addition, according to the present disclosure, there is provided a program causing a computer to implement: a wireless communication function of receiving a second frame used for releasing a stop of transmission of a frame caused by a first frame, the second frame including first destination information specifying a destination stored in the first frame, the first frame being used for stopping transmission of frames of communication devices other than the destination and serving as a response to a communication request; and a control function of controlling transmission of a frame on a basis of the second frame received by the wireless communication function.

Advantageous Effects of Invention

As described above, according to the present disclosure, a mechanism capable of presenting communication collision while suppressing a reduction in the opportunities to access the transmission path is provided. Note that the effects described above are not necessarily limitative. With or in the place of the above effects, there may be achieved one of the effects described in this specification or other effects that may be grasped from this specification.

BRIEF DESCRIPTION OF DRAWINGS

FIG. 2 is a diagram illustrating a configuration of an existing RTS frame.

FIG. 3 is a diagram illustrating a configuration of an existing CTS frame.

FIG. 4 is a diagram illustrating a configuration of an existing Ack frame.

FIG. 6 is a diagram illustrating a configuration of an existing CF-End frame.

FIG. 15 is a diagram illustrating an example of a configuration of a second CF-End frame transmitted by a transmission device according to one embodiment of the present disclosure.

FIG. 16 is a diagram illustrating another example of a confirmation of a second CF-End frame transmitted by a transmission device according to one embodiment of the present disclosure.

FIG. 22 is a diagram illustrating an example of a configuration of a second CF-End+CF-Ack frame transmitted by a transmission device according to a first modified example of one embodiment of the present disclosure.

FIG. 23 is a diagram illustrating another example of a configuration of a second CF-End+CF-Ack frame transmitted by a transmission device according to the first modified example of one embodiment of the present disclosure.

FIG. 24 is a diagram illustrating an example of a configuration of a second CF-End+CF-Ack frame transmitted by a transmission device according to a second modified example of one embodiment of the present disclosure.

MODE(S) FOR CARRYING OUT THE INVENTION

Figure 1:
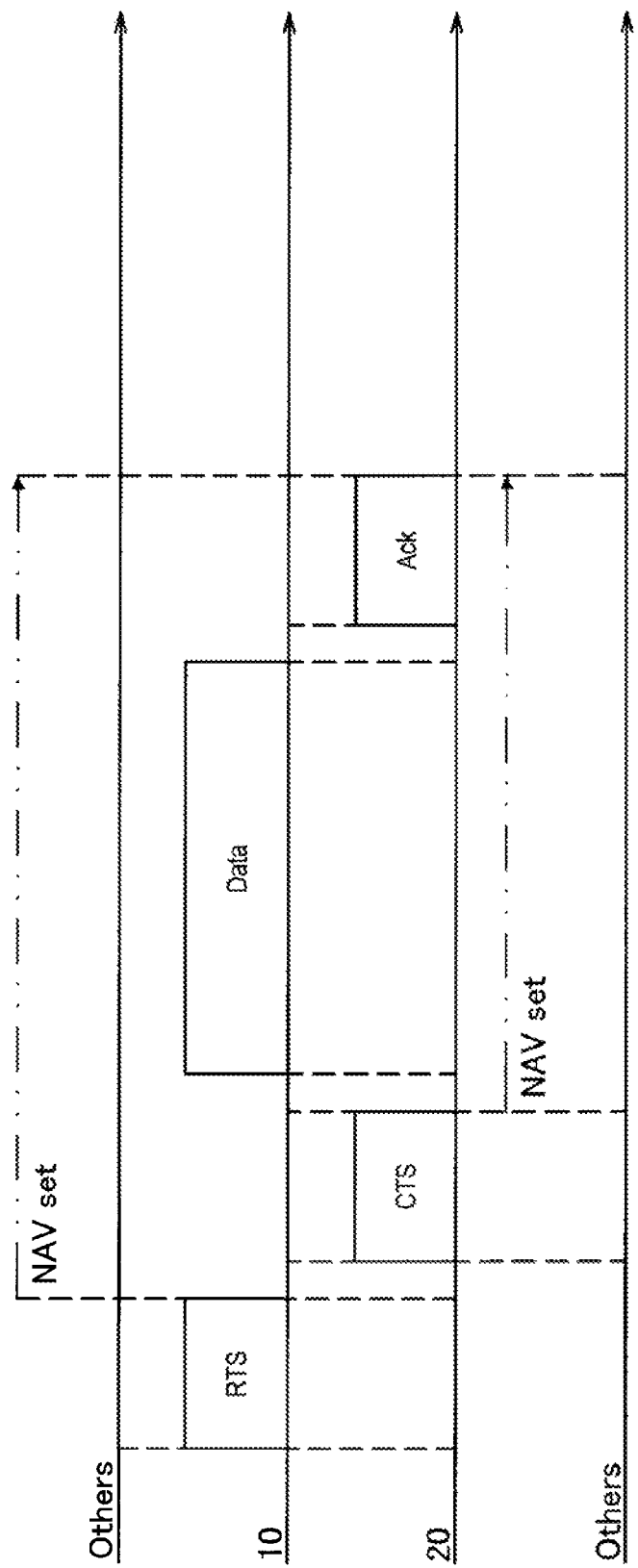
FIG. 1 is a diagram illustrating an example of control of a NAV using an existing RTS and CTS.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are cases in which a plurality of elements having substantially the same function are distinguished by adding different numbers to the end of the same reference numeral. For example, a plurality of elements having substantially the same function are distinguished as necessary like a STA 200A and a STA 200B. However, in a case where it is unnecessary to distinguish elements having substantially the same function, only the same reference numeral is added. For example, in a case where it is unnecessary to particularly distinguish the STA 200A and the STA 200B, they are simply referred to as "STAs 200."

Further, the description will proceed in the following order.
1. Introduction
2. One embodiment of present disclosure
2-1. Configuration of communication system
2-2. Basic function of communication device
2-3. Function details of communication device
2-4. Process of communication device
2-5. Operation examples
2-6. Conclusion of one embodiment of present disclosure
3. Modified examples
4. Application example
5. Conclusion

1. INTRODUCTION

First, the technology related to a communication device according to one embodiment of the present disclosure will be described. As this technology, there is a mechanism called virtual carrier sensing as described above. Specifically, in virtual carrier sensing, a NAV is controlled using a mechanism such as RTS/CTS. First, a basic form of virtual carrier sensing will be described with reference to FIG. 1. FIG. 1 is a diagram illustrating an example of control of a NAV using an existing RTS and CTS.

As illustrated in FIG. 1, a transmission device 10 that desires data transmission transmits an RTS frame to a reception device 20 which is a destination of data transmission. The reception device 20 winch has received the RTS frame transmits a CTS frame to the transmission device 10 in a case in which the data transmission to the transmission device 10 is permitted.

Here, the RTS frame or the CTS frame may be received by communication devices other than the transmission device 10 and the reception device 20 which are the destinations of the RTS frame and the CTS frame. The other communication device sets the NAV on the basis of transmission period information stored in the received RTS frame or the CTS frame as illustrated in FIG. 1.

Figure 2:
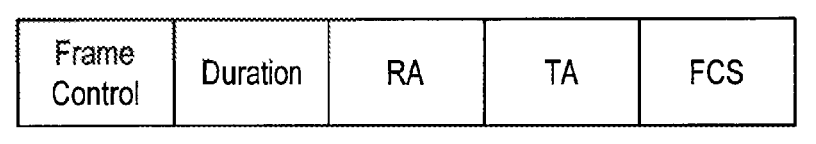
Figure 3:
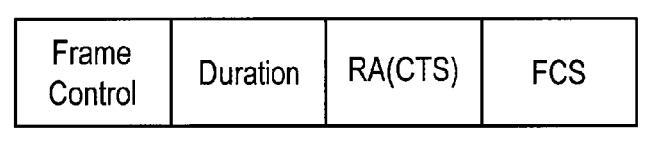
Figure 4:
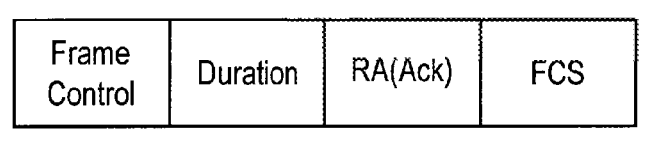

The transmission device 10 and the reception device 20 communicate the data frame after communication of the CTS frame. If the data frame is successfully communicated, an acknowledgment (Ack) frame is communicated, and data transmission ends. Further, the communication device releases the NAV because the NAV period elapses as the communication related to the data transmission between the transmission device 10 and the reception device 20 ends. Accordingly, the other communication devices can access the transmission path. Configurations of the RTS frame, the CTS frame, and the Ack frame will be further described with reference to FIGS. 2 to 4. FIG. 2 is a diagram illustrating a configuration of an existing RTS frame. FIG. 3 is a diagram illustrating a confirmation of an existing CTS frame. FIG. 4 is a diagram illustrating a configuration of an existing Ack frame.

As illustrated in FIG. 2, the RTS frame has fields such as Frame Control Duration, Receiver Address (RA), Transmitter Address (TA), and Frame Check Sequence (FCS). The transmission period information indicating a transmission period of a frame is stored in the Duration field. Destination information of the RTS frame is stored in the RA field, and transmission source information of the RTS frame is stored in the TA field. Therefore, the other communication device that has received the RTS frame sets the NAV on the basis of the transmission period information stored in the Duration field.

Further, as illustrated in FIG. 3, the CTS frame has fields such as Frame Control, Duration, RA, and FCS. Similarly to the RTS frame, transmission period information indicating a transmission period of a frame is stored in the Duration field. Destination information of the CTS frame is stored in the RA field. Therefore, the other communication device that has received the CTS frame sets the NAV on the basis of the transmission period information stored in the Duration field. Further, the TA field is not prepared in the CTS frame.

Further, as illustrated in FIG. 4, the Ack frame has fields such as Frame Control, Duration, RA, and FCS. Similarly to the CTS frame, transmission period information indicating a transmission period of a frame is stored in the Duration field. Destination information of the Ack frame is stored in the RA field. Further, similarly to the CTS frame, the TA field is not prepared in the Ack frame.

Figure 5:
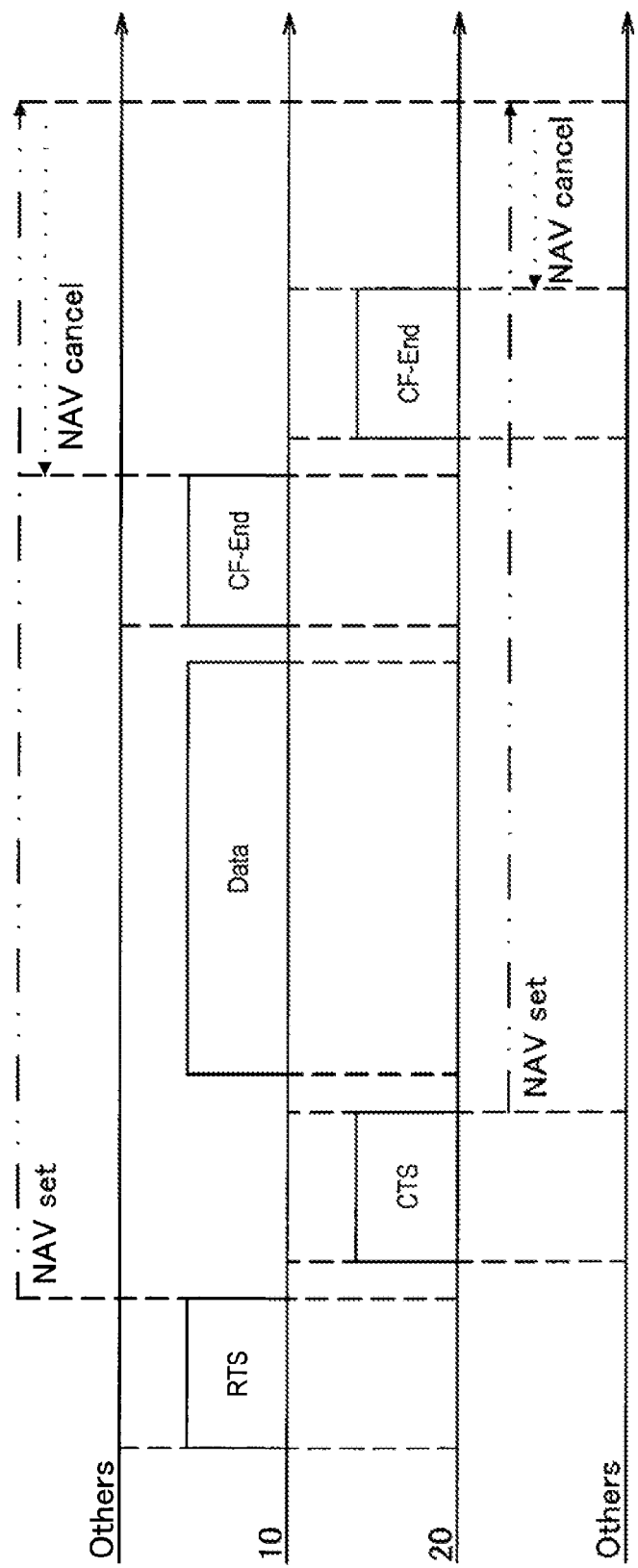
FIG. 5 is a diagram illustrating an example of control of a NAV using an existing CF-End.

Next, virtual carrier sensing using a mechanism of releasing the NAV before the NAV period ends will be described. Specifically, a notification indicating the end of the transmission period, that is, the end of the NAV period, is given to the other communication devices using CF-End. Virtual carrier sensing using a mechanism of releasing the NAV will be described with reference to FIG. 5. FIG. 5 is a diagram illustrating an example of control of the NAV using the existing CF-End.

The transmission device 10 that desires data transmission transmits the RTS frame to the reception device 20 which is the destination of data transmission as illustrated in FIG. 5. The reception device 20 which has received the RTS frame transmits the CTS frame to the transmission device 10 in a case in which the data transmission to the transmission device 10 is permitted. Further, in a case in which the RTS frame or the CTS frame is received, communication devices other than the transmission device 10 and the reception device 20 which are the destinations of the RTS frame and CTS frame set the NAV as illustrated in FIG. 5.

The transmission device 10 and the reception device 20 communicate the data frame after communication of the CTS frame. Here, if the data transmission ends before a scheduled transmission period ends, the transmission device 10 transmits a CF-End frame as illustrated in FIG. 5. The reception device 20 which has received the CF-End frame ends the communication with the transmission device 10. Further, the reception device 20 which has received the CF-End frame may separately transmit the CF-End frame as illustrated in FIG. 5. Further, the other communication device releases the NAV if the CF-End frame is received. Accordingly, the other communication device can access the transmission path. Further, a configuration of the CF-End frame will be described with reference to FIG. 6. FIG. 6 is a diagram illustrating a configuration of an existing CF-End frame.

As illustrated in FIG. 6, the CF-End frame has fields such as Frame Control, Duration, RA, BSSID (TA), and FCS. Transmission period information indicating a transmission period of a frame is stored in the Duration field. A broadcast address is stored in the RA field, and a BSSID of a BSS to which the communication device transmitting the CF-End frame belongs is stored in the BSSID field.

Figure 7:
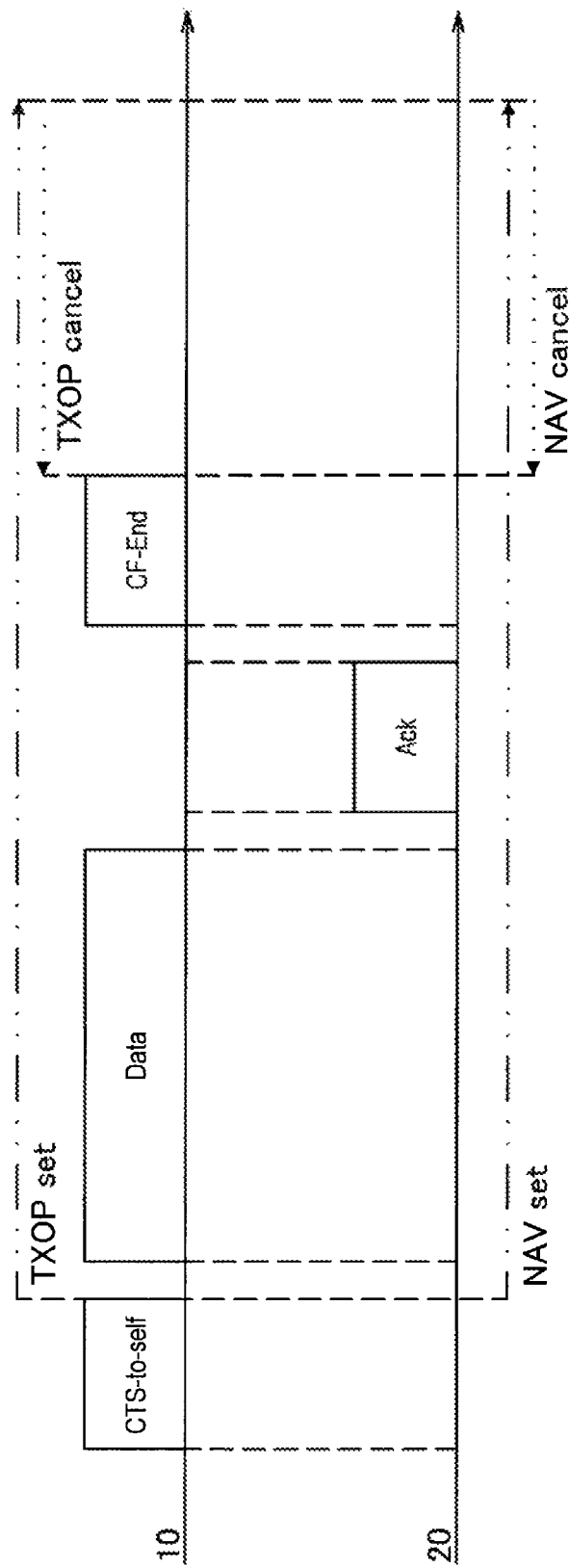
FIG. 7 is a diagram illustrating an example of control of a NAV using only an existing CTS.

Further, an application form of virtual carrier sensing will be described. Specifically, there is a mechanism for controlling the NAV using only the CTS (CTS-to-self) out of the RTS and the CTS. Virtual carrier sensing in which the NAV is controlled using only the CTS will be described with reference to FIG. 7. FIG. 7 is a diagram illustrating an example of control of the NAV using only the CTS.

The transmission device 10 that desires data transmission transmits the CTS-to-self frame as illustrated in FIG. 7. The reception device 20 which has received the CFS-to-self frame sets the NAV on the basis of the transmission period information stored in the CTS-to-self frame. The transmission device 10 transmits the data frame after transmitting the CTS-to-self frame. If the Ack frame is received after the data frame is transmitted, and the data transmission ends before the transmission period ends, the transmission device 10 transmits the CF-End frame. The reception device 20 which has received the CF-End frame releases the NAV. Further, the configuration of the CTS-to-self frame is substantially the same as that of the CTS frame, but the configuration of the CTS-to-self frame differs from that of the CTS frame in that information specifying the transmission source information of the CTS-to-self frame, that is, the BSSID (hereinafter also referred to as "BSSID information"), is stored in the RA field.

Figure 8:
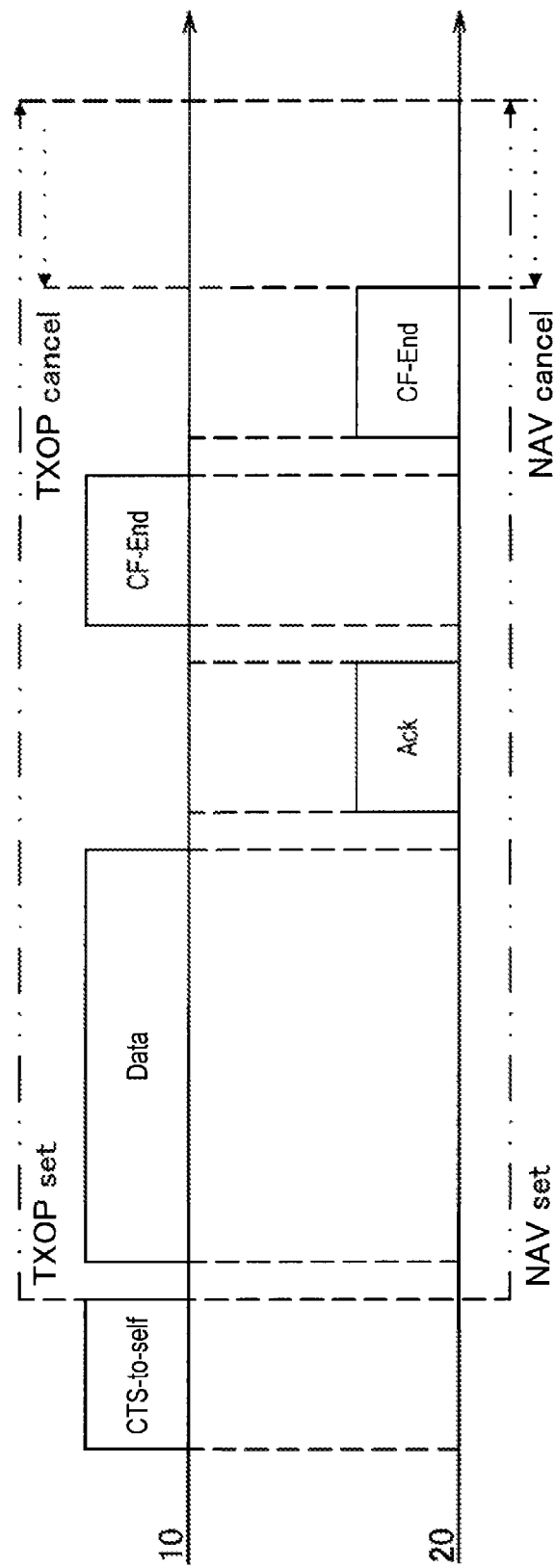
FIG. 8 is a diagram illustrating another example of control of a NAV using only an existing CTS.

Further, the CF-End frame may also be transmitted from the reception device 20 as described above. An example in which the CF-End frame is also transmitted from the communication device winch has received the CF-End frame under control of the NAV using only the CTS will be described with reference to FIG. 8. FIG. 8 is a diagram illustrating another example of the control of the NAV using only the existing CTS.

As illustrated in FIG. 8, the reception device 20 which has received the CTS-to-self frame transmitted from the transmission device 10 sets the NAV. At this time, other communication devices located near the reception device 20 also receive the CTS-to-self frame and set the NAV. Then, if the data transmission ends before the transmission period ends, the transmission device 10 transmits the CF-End frame. The reception device 20 which has received the CF-End frame transmits the CF-End frame separately as illustrated ins FIG. 8. The other communication devices which have received the CF-End frame transmitted separately release the NAV.

Figure 9:
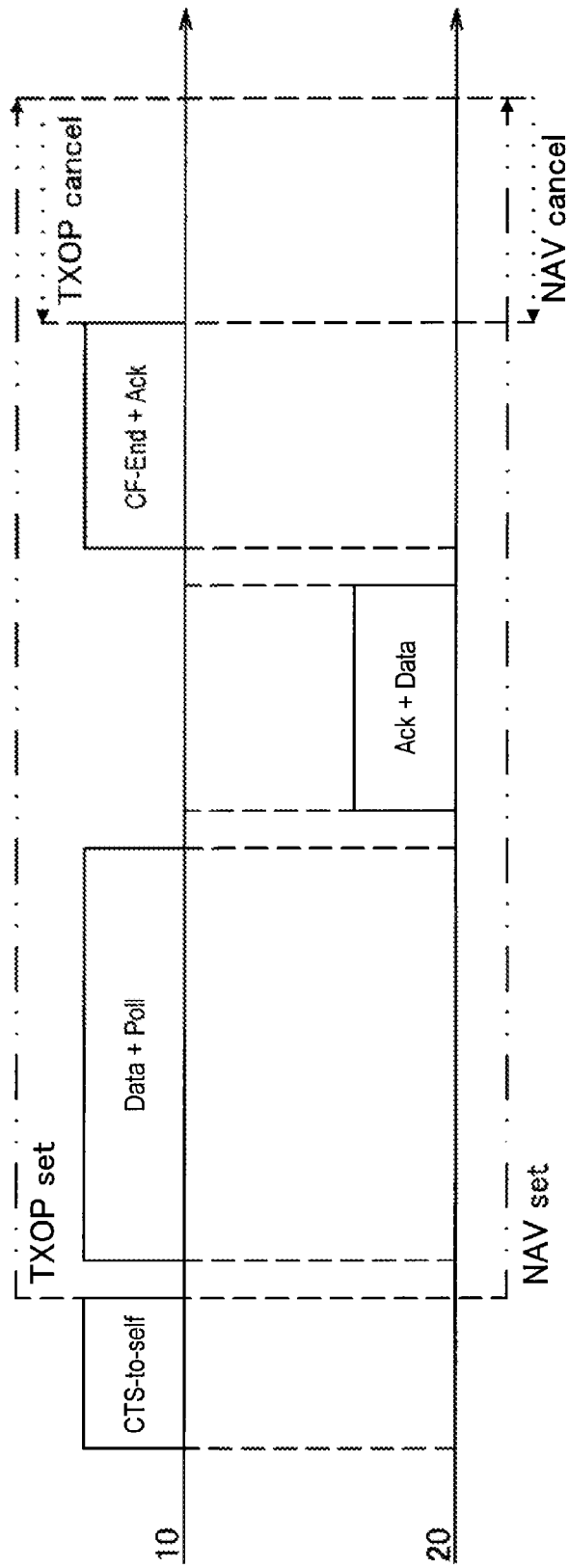
FIG. 9 is a diagram illustrating an example of control of a NAV using a CF-End doubling as an existing Ack.

Further, the CF-End may double as Ack. The control of the NAV using the CF-End doubling as Ack will be described with reference to FIG. 9. FIG. 9 is a diagram illustrating an example of control of a NAV using the CF-End doubling as an existing Ack.

As illustrated in FIG. 9, the reception device 20 which has received the CTS-to-self frame transmitted from the transmission device 10 sets the NAV. Then, the transmission device 10 transmits a data frame and a poll frame after transmitting the CTS-to-self frame. The reception device 20 which has received the data frame and the poll frame transmits an Ack frame for the data frame and a data frame based on the poll frame. The transmission device 10 which has received the Ack frame and the data frame transmits a CF-End+CF-Ack frame. If the CF-End+CF-Ack frame is received, the reception device 20 releases the NAV. Further, the configuration of the CF-End CF-Ack frame is substantially the same as that of the normal CF-End frame described above, but the configuration of the CF-End+CF-Ack frame differs from that of the normal CF-End frame in that information indicating the CF-End+CF-Ack frame is stored in a Subtype field of the Frame Control field.

Figure 10:
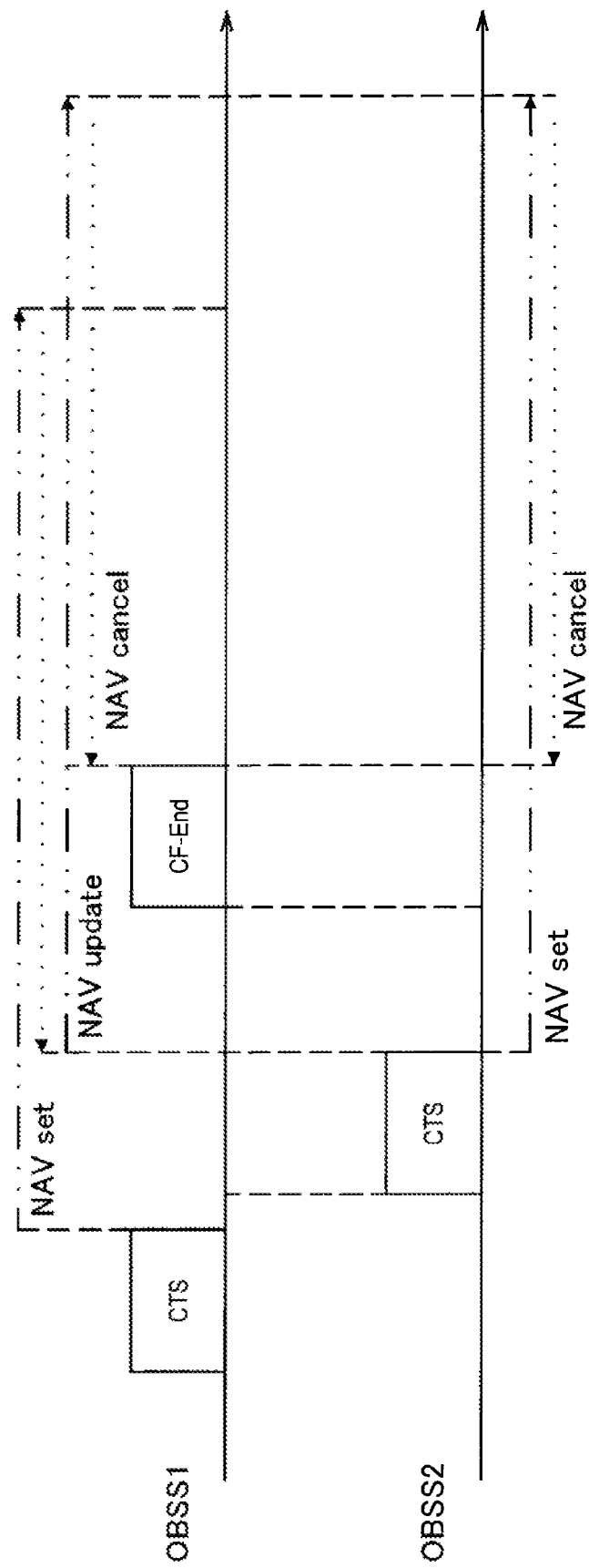
FIG. 10 is a diagram illustrating an example of release of a NAV in existing carrier sensing.

Virtual carrier sensing has been deserved above. However, in the communication using virtual carrier sensing described above, communication collision is likely to occur, or transmission opportunities are likely to decrease. Specifically, in a case in which there is a BSS with an overlapping communication range (hereinafter also referred to as an "overlapping BSS (OBSS)"), if the CF-End frame from another OBSS 2 arrives at an OBSS 1 in which the NAV is set, the NAV is released. However, since communication is continued as the NAV is assumed to be continued in the OBSS 1, if the communication device which has released NAV starts communication, communication collision occurs. On the other hand, in order to prevent such communication collision, the communication device not releasing the NAV even when the CF-End frame is received can be considered. However, in this case, the communication device misses the transmission opportunity, and the communication throughput decreases. A phenomenon occurring in the existing virtual carrier sensing will be more specifically described with reference to FIG. 10 and FIG. 11. FIG. 10 is a diagram illustrating an example of release of a NAV in existing carrier sensing. Further, FIG. 11 is a diagram illustrating another example of release of a NAV in existing carrier sensing.

In FIG. 10, after the CTS frame is communicated, and the NAV is set in the OBSS 1, the CTS frame is communicated, and the NAV is set in the OBSS 2. Here, if the CTS frame from the OBSS 2 reaches the OBSS 1, in a case in which the NAV based on the CTS frame of the OBSS 2 is longer than the NAV in the OBSS 1, the NAV in the OBSS 1 is updated on the basis of the CTS frame from the OBSS 2. Further, only the destination information is stored in the CTS frame, and the transmission source information is not stored. Therefore, the BSS to which the transmission source of the CTS frame belongs is unable to be determined from the CTS frame.

In this state, the CF-End frame is transmitted in the OBSS1, and if the transmitted CF-End frame teaches the OBSS 2, the communication device belonging to the OBSS 2 releases the set NAV. This is because the BSS for the NAV set on the basis of the reception of the CTS frame is unable to be specified as described above, and the NAV is uniformly released in response to the reception of the CF-End frame. As a result, if the communication device which has released the NAV starts communication in the OBSS 2, communication collision may occur in the OBSS 2.

Figure 11:
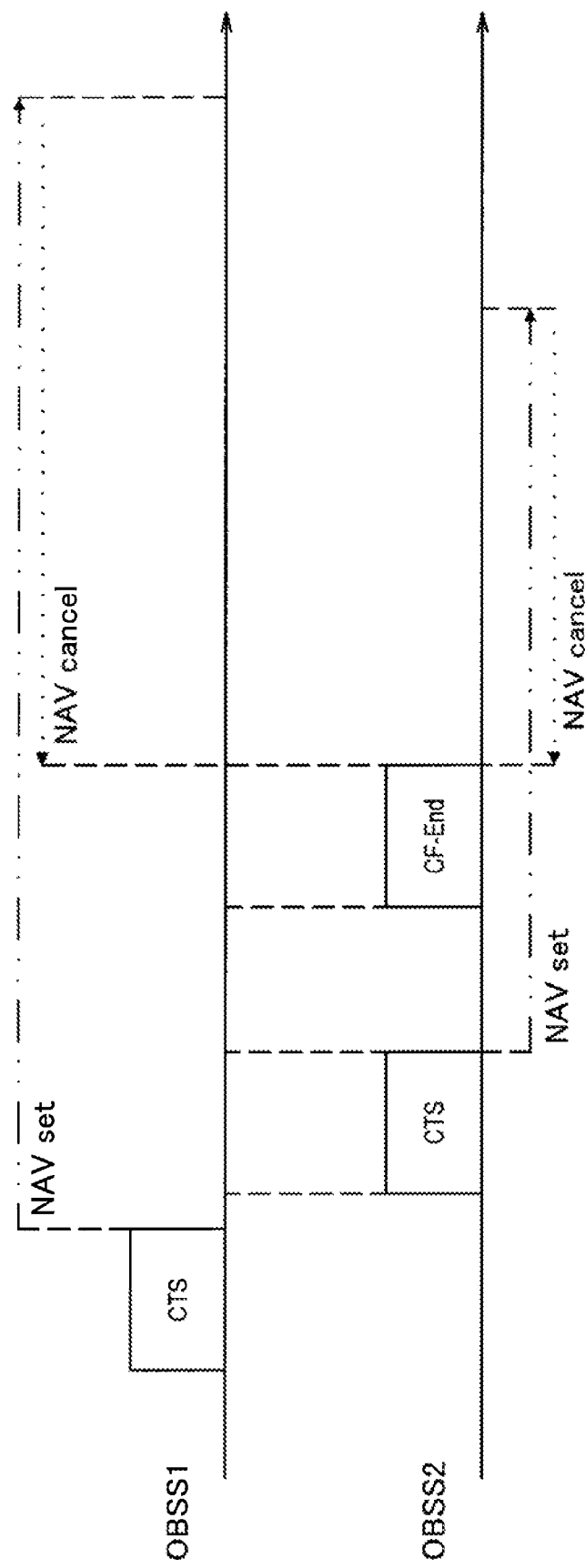
FIG. 11 is a diagram illustrating another example of release of a NAV in existing carrier sensing.

Further, in FIG. 11, after the CTS frame is communicated, and the NAV is set in the OBSS 1, the CTS frame is communicated, and the NAV is set in the OBSS 2. Here, even when the CTS frame from the OBSS 2 reaches the OBSS 1, in a case in which the NAV based on the CTS frame of the OBSS 2 is smaller than the NAV in the OBSS 1, the NAV in the OBSS 1 is not updated.

In this state, the CF-End frame is transmitted in the OBSS 2, and if the transmitted CT-End frame reaches the OBSS 1, the communication device belonging to the ORSS 1 releases the set NAV. As a result, if the communication device which has released the NAV starts communication in the OBSS1, communication collision may occur in the OBSS 1.

In this regard, in one embodiment of the present disclosure, a communication system capable of preventing communication collision while suppressing a reduction in opportunities to access the transmission path and a communication device for implementing the communication system are proposed. Hereinafter a device that transmits the CF-End frame is also referred to as a "transmission device," and a device that sets the NAV by at least the CTS frame and receives the CF-End frame is also referred to as a "reception device".

2. ONE EMBODIMENT OF PRESENT DISCLOSURE

A communication system and a communication device according to one embodiment of the present disclosure will be described.

<2-1. Configuration of Communication System>

Figure 12:
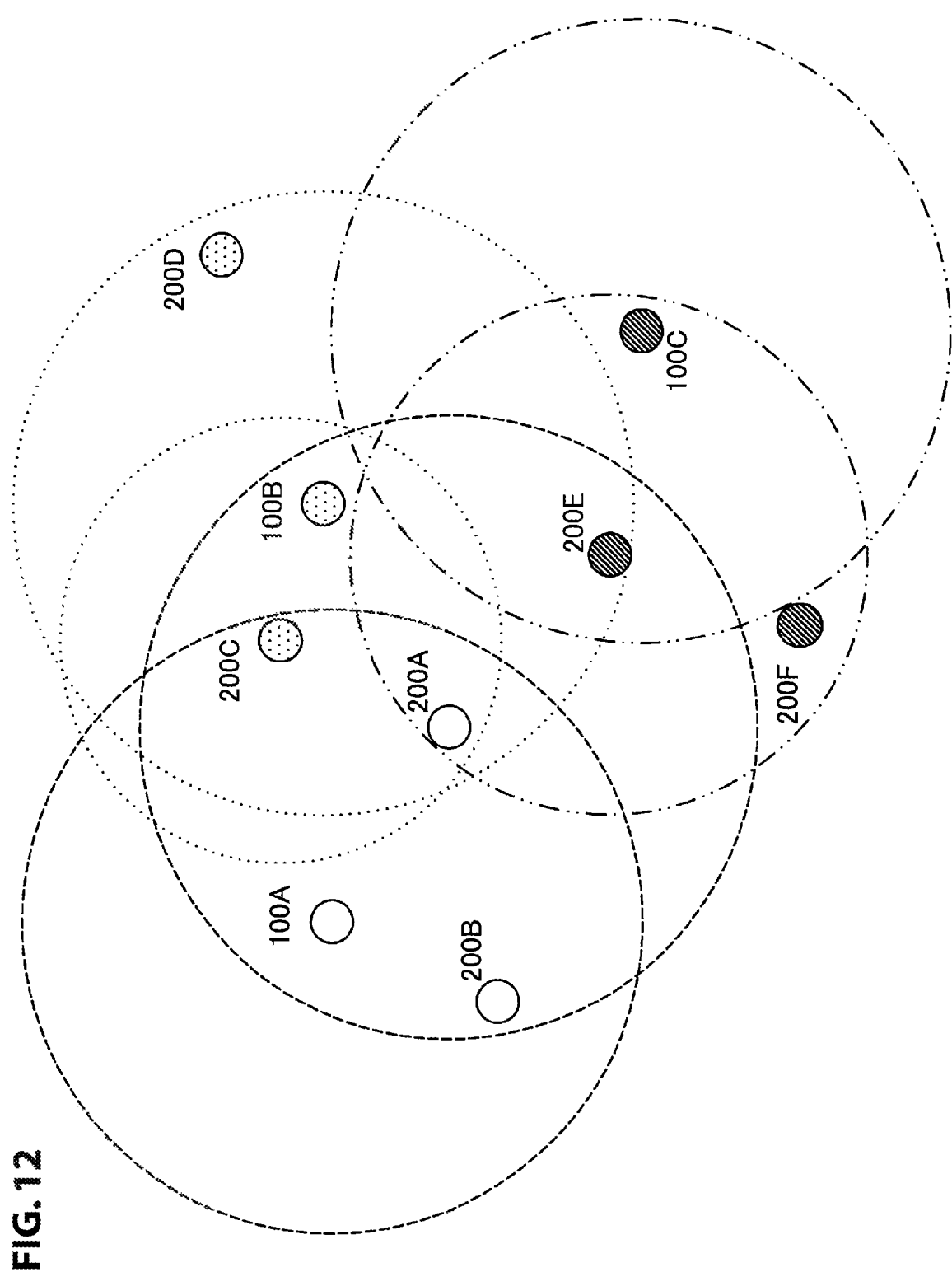
FIG. 12 is a diagram illustrating a configuration example of a communication system according to one embodiment of the present disclosure.

First, a communication system according to one embodiment of the present disclosure will be described with reference to FIG. 12. FIG. 12 is a diagram illustrating a configuration example of a communication system according to one embodiment of the present disclosure.

A communication system according to one embodiment of the present disclosure includes a plurality of communication devices. The communication devices communicate frames with each other. Further, the communication devices have a virtual carrier sensing function.

Specifically, the communication system includes an AP 100 and an STA 200, and a wireless communication network such as a BSS is formed by the AP 100 and the STA 200. Then, the AP 100 and the STA 200 communicate using virtual carrier sensing. For example, an AP 100A and each of STAs 200A and 200B illustrated in FIG. 12 establish a communication connection, so that a BSS 1 is formed. Further, in a case in which data transmission is performed from the STA 200A to the AP 100A, the RTS frame is transmitted from the STA 200A, and the CTS frame is received from the AP 100A which has received the RTS frame. Upon receiving the RTS frame or the CTS frame, the STA 200O sets the NAV and does not perform communication until the data transmission from the STA 200A to the AP 100A ends. In a case in which the data transmission ends before the NAV period ends, the AP 100A or the STA 200A releases the NAV set in the STA 200B by transmitting the CF-End frame.

Further, there are cases in which there are a plurality of BSSs, and the plurality of BSSs are adjacent to one another. For example, a BSS 2 is formed by an AP 100B and STAs 200C and 200D illustrated in FIG. 12, and a BSS 3 is formed by an AP 100C and STAs 200E and 200F illustrated in FIG. 12. Hereinafter, the BSS 2 and the BSS 3 are also referred to as an OBSS 2 and an OBSS 3 because they are BSSs that overlap the BSS 1.

Further, virtual carrier sensing for the BSS to which it belongs is executed with a high degree of certainty, but virtual carrier sensing for the OBSS may be controlled depending on a situation. For example, as illustrated in FIG. 12, the STA 200A is located at a distance at which it can communicate with an AP 100B and an STA 200C belonging to the OBSS 2. Therefore, there are cases in which the STA 200A receives the CTS frame (including the CTS-to-self) from the AP 100B and receives the RTS frame from the STA 200C. In this regard, the STA 200A sets the NAV 2 for the OBSS (hereinafter also referred to as an "ONAV") 2 with a high degree of certainty.

On the other hand, as illustrated in FIG. 12, the STA 200A is located at a distance at which it can communicate with the STA 200E belonging to the OBSS 3. Therefore, the STA 200A may receive the RTS frame from the STA 200E. However, it is difficult to receive the CTS frame (including the CTS-to-self) from the AP 100C. In this regard, the STA 200A arbitrarily sets the ONAV 3.

In the above example, the AP 100 operates as the transmission device, and the STA 200 operates as the reception device, but the STA 200 may operate as the transmission device, and the AP 100 may operate as the reception device.

<2-2. Basic Function of Communication Device>

Figure 13:
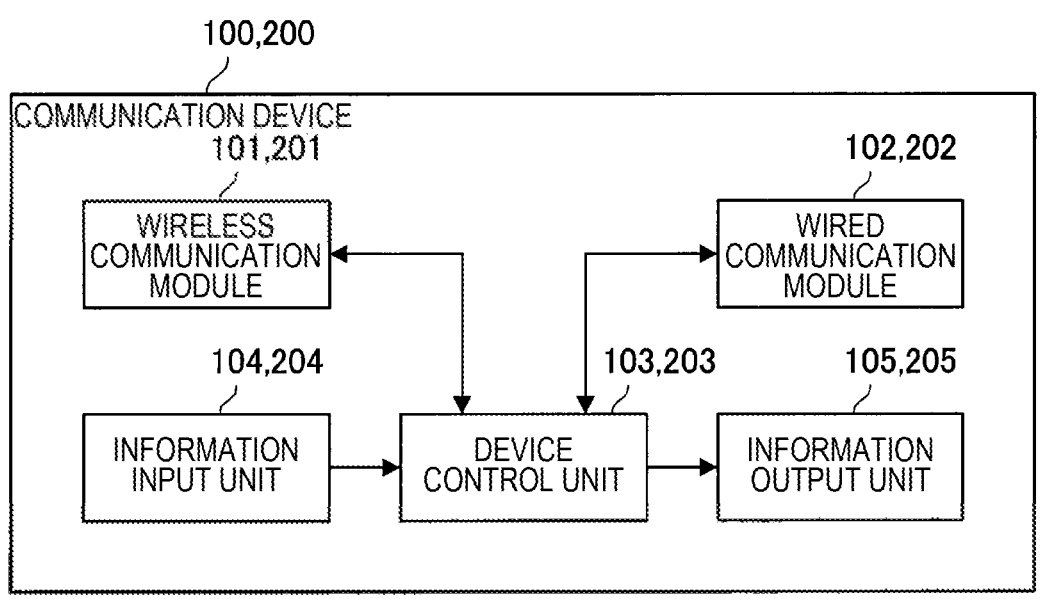
FIG. 13 is a block diagram illustrating an example of schematic functional configurations of a transmission device and a reception device according to one embodiment of the present disclosure.

Next, basic functions of a transmission device 100 and a reception device 200 that are communication devices according to one embodiment of the present disclosure will be described. First, functional configurations of the transmission device 100 and the reception device 200 according to one embodiment of the present disclosure will be described with reference to FIG. 13. FIG. 13 is a block diagram illustrating an example of schematic functional configurations of a transmission device 100 and a reception device 200 according to one embodiment of the present disclosure. Further, since the basic functions of the transmission device 100 and the reception device 200 are substantially the same, only the transmission device 100 will be described.

As illustrated in FIG. 13, a transmission device 100 includes a wireless communication module 101, a wired communication module 102, a device control unit 103, an information input unit 104, and an information output unit 105.

The wireless communication module 101 performs wireless communication with external devices. Specifically, the wireless communication module 101 transmits data obtained from the device control unit 103 and provides received data to the device control unit 103. The details will be described later.

The wired communication module 102 communicates with an external device via wired communication. Specifically, the wired communication module 102 is connected to the Internet and communicates with the external device via the Internet. For example the wired communication module 102 transmits data acquired via communication by the wireless communication module 101 to the external device via the Internet.

The device control unit 103 controls operation of the transmission device 100 in general. Specifically, the device control unit 103 controls communication of the wireless communication module 101 and the wired communication module 102. For example, the device control unit 103 causes the wireless communication module 101 or the wired communication module 102 to transmit data obtained from the information input unit 104. Further, the device control unit 103 causes the information output unit 105 to output data obtained by the communication of the wireless communication module 101 or the wired communication module 102.

The information input unit 104 receives an input from the outside of the transmission device 100. Specifically, the information input unit 104 receives a user input or information obtained from a sensor. For example, the information input unit 104 is an input device such as a keyboard or a touch panel or a detection device such as a sensor.

The information output unit 105 outputs data. Specifically, the information output unit 105 outputs data instructed from the device control unit 103. For example, the information output unit 105 is a display that outputs images on the basis of image information, a speaker that outputs sounds or music on the basis of audio information, or the like.

Further, the wired communication module 102, the information input unit 104 and the information output unit 105 among the above components may not be included in the transmission device 100.

(Configuration of Wireless Communication Module)

Figure 14:
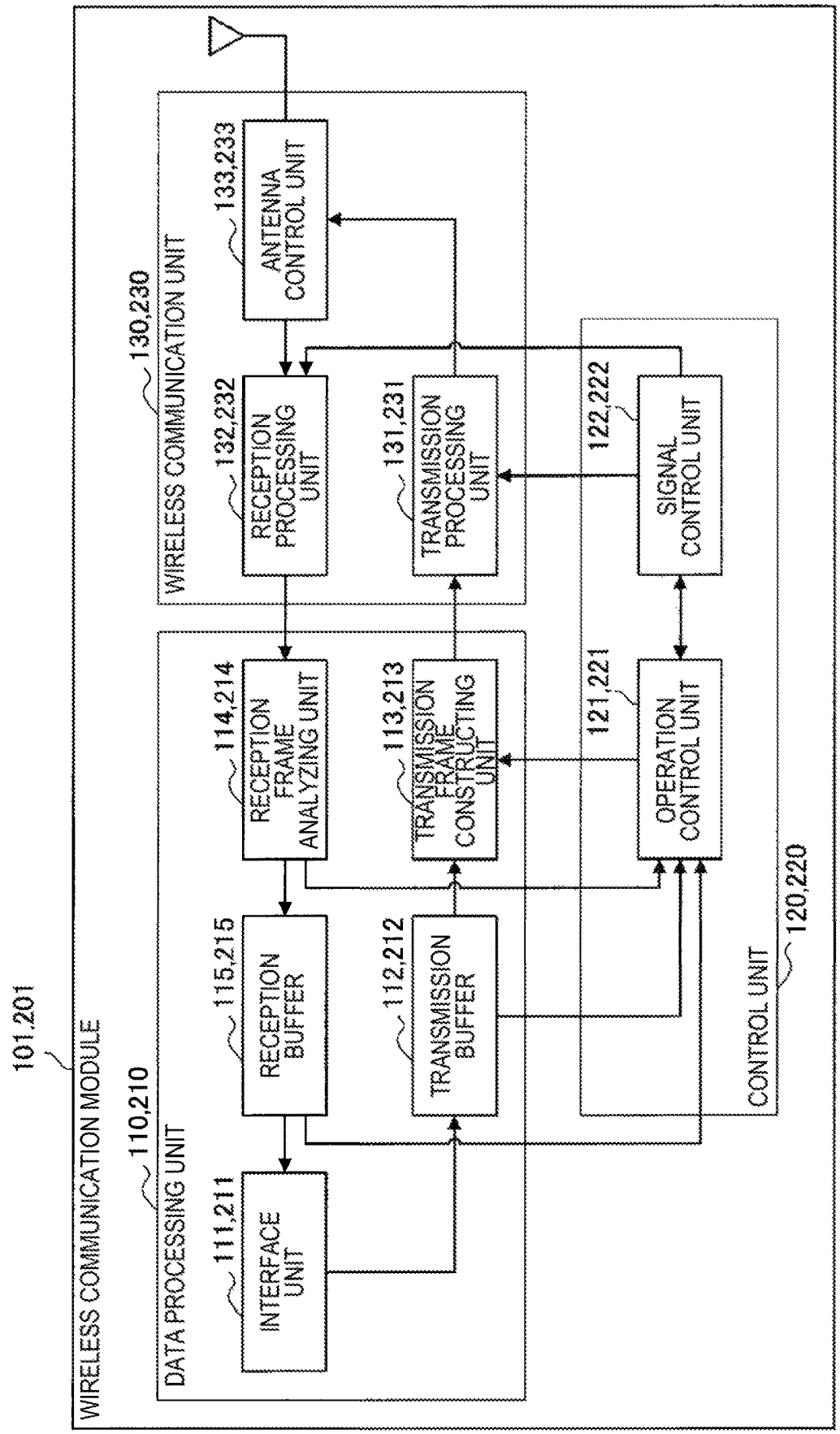
FIG. 14 is a block diagram illustrating an example of a schematic functional configuration of a wireless communication module according to the embodiment of the present disclosure.

Next, a functional configuration of the wireless communication module 101 will be described with reference to FIG. 14. FIG. 14 is a block diagram illustrating an example of a schematic functional configuration of the wireless communication module 101 according to an embodiment of the present disclosure.

As illustrated in FIG. 14, the wireless communication module 101 includes a data processing unit 110, a control unit 120, and a wireless communication unit 130.

(1. Data Processing Unit)

The data processing unit 110 includes an interface unit 111, a transmission buffer 112, a transmission frame constructing unit 113, a reception frame analyzing unit 114, and a reception buffer 115 as illustrated in FIG. 14 as the processing unit.

The interface unit 111 is an interface connected to other functional components installed in the transmission device 100. Specifically, the interface unit 111 performs reception of data that is desired to be transmitted from another functional component, for example, the device control unit 103, provision of reception data to the device control unit 103, or the like.

The transmission buffer 112 stores data to be transmitted. Specifically, the transmission buffer 112 stores data obtained by the interface unit 111.

The transmission frame constructing unit 113 generates a frame to be transmitted. Specifically the transmission frame constructing unit 113 generates a frame on the basis of data stored in the transmission buffer 112 or control information set by the control unit 120. For example, the transmission frame constructing unit 113 generates a frame (packet) from data acquired from the transmission buffer 112, and performs a process of adding a MAC header for medium access control (MAC) and an error detection code to the generated frame and the like.

The reception frame analyzing unit 114 analyzes a received frame. Specifically, the reception frame analyzing unit 114 determines a destination of a frame received by the wireless communication unit 130 and acquires data or control information included in the frame. For example, the reception frame analyzing unit 114 acquires data and the like included in the received frame by performing analysis of the MAC header, detection and correction of a code error, a reordering process, and the like on the received frame.

The reception buffer 115 stores received data. Specifically, the reception buffer 115 stores data acquired by the reception frame analyzing unit 114. For example, the reception buffer 115 continues to hold data which is a part of a predetermined series of data until a predetermined series of data is obtained. Then, if the predetermined series of data is obtained, the predetermined series of data is provided to a communication upper layer via the interface unit 111.

(2. Control Unit)

The control unit 120 includes an operation control unit 121 and a signal control unit 122 as illustrated in FIG. 14 as parts of the processing unit and the acquisition unit.

The operation control unit 121 controls an operation of the data processing unit 110. Specifically, the operation control unit 121 controls the occurrence of communication. For example, if a communication connection request occurs, the operation control unit 121 causes the data processing unit 110 to generate frames related to a connection process or an authentication processing such as an association process or an authentication process.

Further, the operation control unit 121 controls generation of frames on the basis of a storage state of data in the transmission buffer 112, an analysis result for a reception frame, or the like. For example, in a case in which data is stored in the transmission buffer 112, the operation control unit 121 instructs the transmission frame constructing unit 113 to generate a data frame in which the data is stored. Further, in a case in which reception of a frame is confirmed by the reception frame analyzing unit 114, the operation control unit 121 instructs the transmission frame constructing unit 113 to generate an acknowledgment frame which is a response to a received frame.

The signal control unit 122 controls an operation of the wireless communication unit 130. Specifically, the signal control unit 122 controls a transmission/reception process of the wireless communication unit 130. For example, the signal control unit 122 causes the wireless communication unit 130 to set a parameter for transmission and reception on the basis of an instruction from the operation control unit 121.

Further, the virtual carder sensing function is controlled by the control unit 120. For example, the control unit 120 causes the data processing unit 110 to generate the RTS frame or the CTS frame in accordance with the presence or absence of a transmission request of a transmission permission. Further, if the RTS frame and the CTS frame are receded, the control unit 120 sets the NAV, and releases the NAV after the NAV period ends.

(3. Wireless Communication Unit)

As illustrated in FIG. 14, the wireless communication unit 130, as a communication unit, includes a transmission processing unit 131, a reception processing unit 132, and an antenna control unit 133.

The transmission processing unit 131 performs a frame transmission process. Specifically, the transmission processing unit 131 generates a signal to be transmitted on the basis of a frame provided from the transmission frame constructing unit 113. More specifically, the transmission processing unit 131 generates a signal related to a frame on the basis of a parameter set in accordance with an instruction from the signal control unit 122. For example, the transmission processing unit 131 generates a symbol stream by performing encoding, interleaving, and modulation on the frame provided from the data processing unit 110 in accordance with a coding and modulation scheme instructed by the control unit 120. Further, the transmission processing unit 131 converts the signal related to the symbol stream obtained by the process at the previous stage into an analog signal, and performs amplification, filtering, and frequency up-conversion on the resulting signal.

The reception processing unit 132 performs a frame reception process. Specifically, the reception processing unit 132 restores the frame on the basis of the signal provided from the antenna control unit 133. For example, the reception processing unit 132 acquires a symbol stream by performing a process opposite to the signal transmission, for example, frequency down-conversion, digital signal conversion, and the like on a signal obtained from an antenna. Further, the reception processing unit 132 acquires a frame by performing demodulation, decoding, and the like on the symbol stream obtained in the process at the previous stage and provides the acquired frame to the data processing unit 110 or the control unit 120.

The antenna control unit 133 controls transmission and reception of signals via at least one antenna. Specifically, the antenna control unit 133 transmits the signal generated by the transmission processing unit 131 via the antenna and provides the signal received via the antenna to the reception processing unit 132.

<2-3. Function Details of Communication Device>

Next, functions of the transmission device 100 and the reception device 200 according to one embodiment of the present disclosure will be described.

(A. Transmission Device)

First, functions of the transmission device 100 will be described.

(A-1. Setting of TXOP)

The transmission device 100 executes virtual carrier sensing at the time of data transmission. Specifically, the transmission device 100 sets a data transmission period by exchanging frames for stopping transmission of frames of communication devices other than the destination, that is, a frame related to a communication request (third frame) and a frame related to a response to the communication request (a first frame).

More specifically, the transmission device 100 sets the TXOP for the data transmission by exchanging the RTS frame (third frame) and the CTS frame (first frame). For example, if a data transmission request occurs, the control unit 120 causes the data processing unit 110 to generate an RTS frame whose destination is a device serving as a destination of data transmission (hereinafter also referred to as a "transmission destination device"). The wireless communication unit 130 transmits the generated RTS frame. Further, if the CTS frame is received by the wireless communication mitt 130, the data processing unit 110 acquires destination information from the received CTS frame, and in a case in which the destination indicated by the acquired destination information is the transmission device 100 itself, the control unit 120 sets the TXOP on the basis of the transmission period information stored in the CTS frame. Thereafter, the transmission device 100 starts transmitting the data frame related to the data transmission.

Further, the transmission device 100 may be the transmission destination device. For example, if an RTS frame whose destination is itself, that is, the transmission device 100, the control unit 120 determines whether or not the data transmission is permitted to a device serving as a transmission source device of the RTS frame (hereinafter also referred to as a "transmission source device"). If it is determined that the data transmission is permitted, the control unit 120 causes the data processing unit 110 to generate a CTS frame whose destination is the transmission source device. The wireless communication unit 130 transmits the generated CTS frame. Then, the control unit 120 sets the TXOP on the basis of the transmission period information notified to the transmission source device using the CTS frame. Thereafter, the transmission device 100 receives the data frame related to the data transmission.

(A-2. CF-End Notification)

In the data transmission period, the transmission device 100 transmits a frame (second frame) for releasing stop of transmission of a frame caused by the frame (first frame) related to the response to the communication request. Specifically, if the data transmission ends before the set TXOP period ends, the control unit 120 causes the data processing unit 110 to generate a CF-End frame (second frame) having the destination information (first destination information) of the CTS frame (first frame) (hereinafter also referred to as a "second CF-End frame"). Then, the wireless communication unit 130 transmits the generated second CF-End frame. For example, in a case in which the transmission device 100 transmits the CTS frame, the control unit 120 causes the data processing unit 110 to generate a second CF-End frame. On the other hand, in a case in which the transmission device 100 does not transmit the CTS frame, the control unit 120 causes the data processing unit 110 to generate an existing CF-End frame. Further, even in a case in which the transmission device 100 is not transmitting the CTS frame, the control unit 120 may cause the data processing unit 110 to generate the second CF-End frame when the CTS frame is being received.

Further, a configuration of the second CF-End frame will be described with reference to FIGS. 15 and 16. FIG. 15 is a diagram illustrating an example of a configuration of the second CF-End frame transmitted by the transmission device 100 according to one embodiment of the present disclosure. FIG. 16 is a diagram illustrating another example of a confirmation of the second CF-End frame transmitted by the transmission device 100 according to one embodiment of the present disclosure.

The second CF-End frame has the destination information of the CTS frame in a region different from a region in which the transmission source information of the second CF-End frame is stored. Specifically, the destination information of the CTS frame is stored in the region in which the destination information of the second CF-End frame is stored. For example, as illustrated in FIG. 15, the second CF-End frame has fields such as Frame Control, CF-End Type, CTS RA, BSSID (TA), and FCS. Information in which a type of CF-End frame is specified (hereinafter also referred to as "CF-End type information") is stored in the CF-End Type field. In detail, a value such as 0x01 is stored in the CF-End Type Field. Further, the destination information of the CTS frame is stored in the CTS RA field. Further, BSSID information in which the BSSID is specified is stored in the BSSID (TA) field. Further, the CF-End Type field corresponds to the Duration field of the existing CF-End frame. Further, the CTS RA field corresponds to the RA field of the existing CF-End frame. For example, a value of 0 (that is, 0x00) stored in the Duration field of the existing CF-End frame, and a broadcast address is stored in the RA field. Therefore, the second CF-End frame is compatible with the existing CF-End frame.

Further, the second CF-End frame may have the destination information of the CFS frame in another region. Specifically, the destination information of the CTS frame in stored in a region different from both of the region in which the transmission source information of the second CF-End frame is stored and the region in which the destination information of the second CT-End frame is stored. For example, as illustrated in FIG. 16, the second CF-End frame has fields such as Frame Control, CF-End Type, RA, BSSID (TA), CTS RA and FCS. A value such as 0x02 is stored in the CF-End Type field of the second CF-End frame. As described above, it is possible to cause various types of CF-End frames to coexist by using information in which the type of second CF-End frame is specified.

(B. Reception Device)

Then, functions of the sec option device 200 will be described.

(B-1. NAV Setting)

The reception device 200 stops transmission of a frame on the basis of virtual carrier sensing. Specifically, the reception device 200 sets the NAV on the basis of a fame for stopping transmission of frames of communication devices other than the destination, that is, a frame (third frame) related to the communication request or a frame (first frame) related to the response to the communication request. Further, the NAV period corresponds to the data transmission period, that is, the TXOP described above.

More specifically, the reception device 200 sets the NAV on the basis of the received RTS frame (third frame) or the CTS frame (first frame). For example, if the RTS frame or the CTS frame whose destination is a communication device other than itself that is, the reception device 200 is received, the control unit 220 sets the NAV on the basis of the transmission period information stored in the received RTS frame or the CTS frame.

Here, the reception device 200 manages the NAV for each piece of destination information of the received CTS frame. Specifically, if the CTS frame is received by the wireless communication unit 230, the data processing unit 210 acquires the destination information from the CTS frame. Then, the control unit 220 associates the acquired destination information of the CTS frame with the set NAV, and causes the acquired destination information of the CTS frame to be stored in a storage unit (not illustrated). Further, the reception device 200 manages the NAV for each of the destination information and the transmission source information of the received RTS frame. Specifically, if the RTS frame is received by the wireless communication unit 230, the data processing unit 210 acquires the destination information and the transmission source information from the RTS frame. Then, the control unit 220 associates the acquired destination information and the transmission source information of the RTS frame with the set NAV, and causes the acquired destination information and the transmission source information of the RTS frame to be stored in the storage unit.

(B-2. Control of NAV Based on CF-End)

The reception device 200 controls the transmission of the frame on the basis of the frame (second frame) which is received during the frame transmission stop period and releases the stop of the transmission of the frame caused by the frame (first frame) related to the response to the communication request. Specifically, the control unit 220 controls the stop of the transmission of the frame for each piece of destination information of the CTS frame on the basis of the destination information included in the received CTS frame and the destination information of the CTS frame included in the received second CF-End frame. More specifically, in a case in which the destination specified from the destination information of the received CTS frame coincides with the destination specified from the destination information of the CTS frame included in the second CF-End frame, the control unit 220 releases the stop of the transmission of the frame for the destination information of the CTS frame related to the coinciding destination.

For example, if the second CF-End frame is recessed before the set NAV period ends the data processing unit 210 acquires the destination information of the CTS frame from the second CF-End frame. The control unit 220 determines whether or not the destination indicated by the destination information of the acquired CTS frame coincides with the destination indicated by the destination information of the CTS frame stored in the storage unit. If it is determined that the destinations of the two CTS frames coincide with each other, the control unit 220 releases the NAV associated with the destination information of the CTS frame.

Further, the reception device 200 controls the stop of the transmission of the frame for each piece of destination information of the RTS frame on the basis of the destination information of the RTS frame included in the received RTS frame and the transmission source information of the second CF-End frame included in the received second CF-End frame. Specifically, in a case in which the destination specified from the destination information of the received RTS frame coincides with the transmission source specified front fee transmission source information of the second CF-End frame included in the second CF-End frame, the control unit 220 releases the stop of the transmission of the frame for the destination information of the RTS frame related to the transmission source.

For example, if the second CF-End frame is received before the set NAV period ends, the data processing unit 210 acquires the transmission source information of the second CF-End frame, that is, the BSSID information from the second CF-End frame. The control unit 220 determines whether or not the BSSID indicated by the acquired BSSID information coincides with the BSSID indicated by the destination information of the RTS frame stored in the storage unit that is, the BSSID information. If it is determined that the two BSSIDs coincide with each other, the control unit 220 releases the NAV associated with the destination information of the RTS frame.

Further, in a case in which the existing CF-End frame is received instead of the second CF-End frame, the reception device 200 performs control only for the NAV associated with the destination information of the RTS frame.

<2-4. Process of Communication Device>

Next, processes of the transmission device 100 and the reception device 200 will be described.

(Process of Transmission Device)

Figure 17:
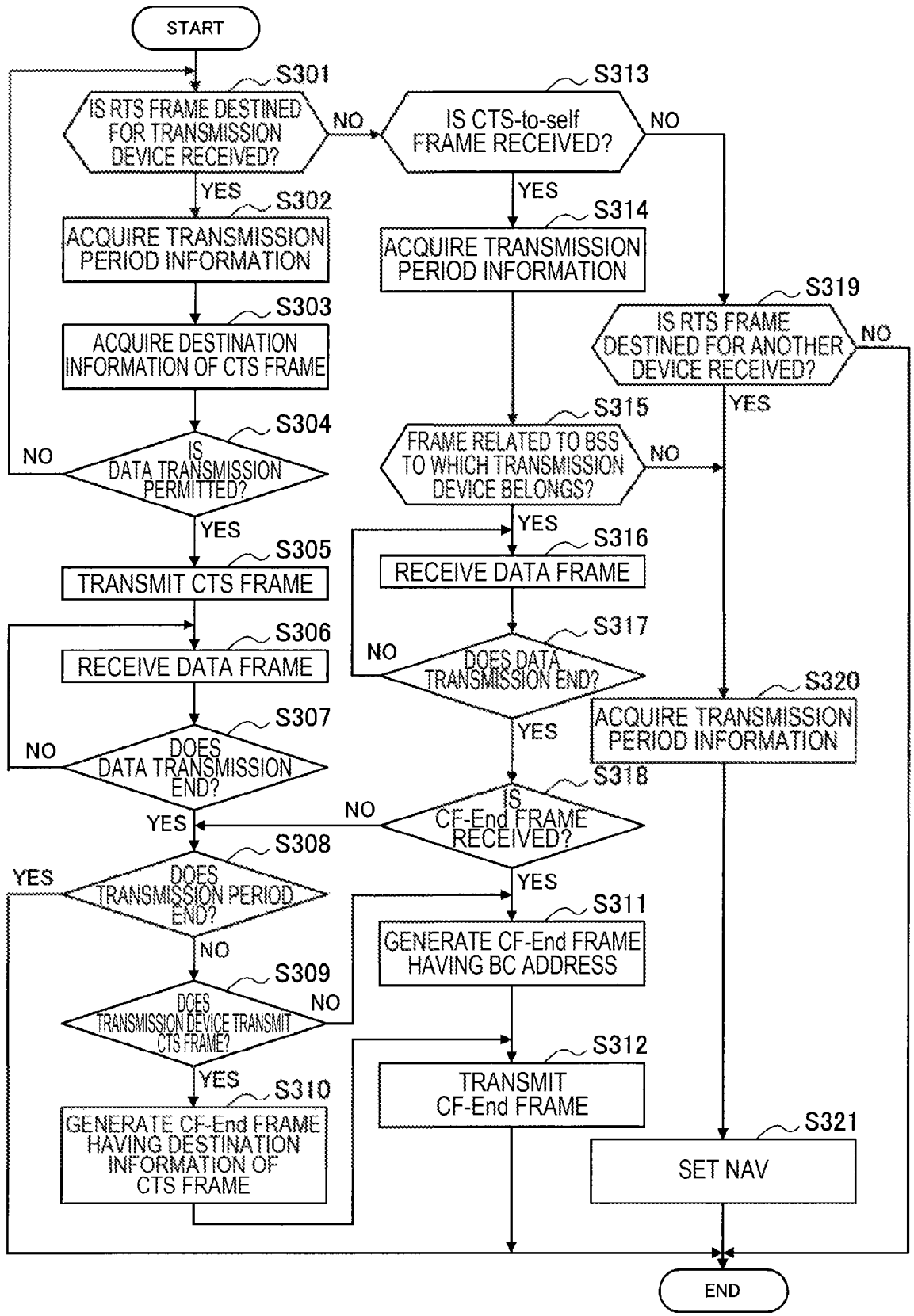
FIG. 17 is a flowchart conceptually illustrating an example of processing performed by a transmission device according to the embodiment of the present disclosure.

First, a process of the transmission device 100 will be described with reference to FIG. 17. FIG. 17 is a flowchart conceptually illustrating an example of a process of the transmission device 100 according to one embodiment of the present disclosure.

The transmission device 100 determines whether or not an RTS frame destined for the transmission device 100 is received (step S301). Specifically, the data processing unit 110 acquires the destination information from the RTS frame received by the wireless communication unit 130, and determines whether or not the communication device indicated by the destination information is the transmission device 100.

If it is determined that the RTS frame destined for the transmission device 100 is received, the transmission device 100 acquires transmission period information (step S302). Specifically, if it is determined that the communication device indicated by the destination information of the RTS frame is the transmission device 100, the data processing unit 110 acquires the transmission period information from the Duration field of the RTS frame.

Then, the transmission device 100 acquires the destination information of the CTS frame (step S303). Specifically, the data processing unit 110 acquires the transmission source information from the received RTS frame. In a case in which the CTS frame is transmitted, the acquired transmission source information is the destination information of the CTS frame.

Then, the transmission device 100 determines whether or not the data transmission is permitted (step S304). Specifically, the control unit 120 determines whether or not the data transmission is permitted to the communication device indicated by the transmission source information of the received RTS frame.

If it is determined that the data transmission is permitted, the transmission device 100 transmits the CTS frame (step S305). Specifically, if it is determined that the data transmission is permitted to the communication device, the control unit 120 causes the data processing unit 110 to generate the CTS frame having the transmission source information acquired in step S303 as the destination information. Then, the wireless communication unit 130 transmits the generated CTS frame. Further, the transmission period information stored in the CTS frame indicates the TXOP for the permitted data transmission.

Thereafter, the transmission device 100 receives the data frame (step S306). Specifically, the wireless communication unit 130 and the data processing unit 110 perform a reception process on the data frame transmitted from the transmission source of the RTS frame.

Then, the transmission device 100 determines whether or not the data transmission ends (step S307). Specifically the control unit 120 determines whether or not the communication of the data frame ends.

If it is determined that the data transmission ends, the transmission device 100 determines whether or not the transmission period ends (step S308). Specifically, the control unit 120 determines whether or not the set TXOP period ends.

If it is determined that the transmission period does not end, the transmission device 100 determines whether or not the transmission device 100 transmits the CTS frame (step S309). Specifically, if it is determined that the data transmission ends but the TXOP period does not end, the control unit 120 determines whether or not the transmission device 100 transmits the CTS frame for the data transmission.

If it is determined that the transmission device 100 transmits the CTS frame, the transmission device 100 generates the second CF-End frame having the destination information of the CTS frame (step S310). Specifically, if it is determined that the control unit 120 transmits the CTS frame, the control unit 120 causes the data processing unit 110 to generate the second CF-End frame having the destination information of the transmitted CTS frame and the CF-End type information having a value of 0x01 or 0x02.

Further, if it is determined that the transmission device 100 does not transmits the CTS frame, the transmission device 100 generates the second CF-End frame having the broadcast address (step S311). Specifically, if it is determined that the transmission device 100 does not transmits the CTS frame, the control unit 120 causes the data processing unit 110 to generate the second CF-End frame having the broadcast address and the CF-End type information having a value of 0x00 as the destination information. Further, the second CN-End frame generated in this step is substantially the same as the existing CF-End frame.

Then, the transmission device 100 transmits the generated second CF-End frame (step S312). Specifically, the wireless communication unit 130 transmits the generated second CF-End frame.

Further, if it is determined that the RTS frame destined for the transmission device 100 is not received in step S301, the transmission device 100 determines whether or not the CTS-to-self frame is received (step S313). Specifically, the data processing unit 110 determines whether or not the CTS-to-self frame is received by the wireless communication unit 130.

If it is determined that the CTS-to-self frame is received, the transmission device 100 acquires the transmission period information (step S314). Specifically, if it is determined that the CTS-to-self frame is received, the data processing unit 110 acquires the transmission period information from the Duration field of the CTS-to-self frame.

Then, the transmission device 100 determines whether or not the received CTS-to-self frame is a frame related to the BSS to which the transmission device 100 belongs (step S315). Specifically, the control unit 120 determines whether or not the BSS indicated by the BSSID information acquired from the RA field of the CTS-to-self frame is the BSS to which the transmission device 100 belongs.

If it is determined that the received CTS-to-self frame is the frame related to the BSS to which the transmission device 100 belongs, the transmission device 100 receives the data frame (step S316), and determines whether or not the data transmission ends each time the data frame is received (step S317).

If it is determined that the data transmission ends, the transmission device 100 determines whether or not the second CF-End frame is received (step S318). Specifically, the control unit 120 determines whether or not the second CF-End frame is received by the wireless communication unit 130.

If it is determined that the second CF-End frame is received, the transmission device 100 generates the second CF-End frame having the broadcast address (step S311), and transmits the generated second CF-End frame (step S312). Further, here, the existing CF-End frame may be transmitted instead of the second CF-End frame.

Further, if it is determined in step S313 that the CTS-to-self frame is not received, the transmission device 100 determines whether or not an RTS frame destined for another communication device is received (step S319). Specifically, if the RTS frame is received by the wireless communication unit 130, the data processing unit 110 determines whether or not the communication device indicated by the destination information of the RTS frame is another communication device other than the transmission device 100.

If it is determined that the RTS frame destined for another communication device is received, the transmission device 100 acquires the transmission period information (step S320) and sets the NAV (step S321). Specifically, if it is determined that the RTS frame destined for another communication device is received, the data processing unit 110 acquires the transmission period information from the Duration field of the RTS frame, and sets the NAV on the basis of the acquired transmission period information.

(Process of Reception Device)

Figure 18:
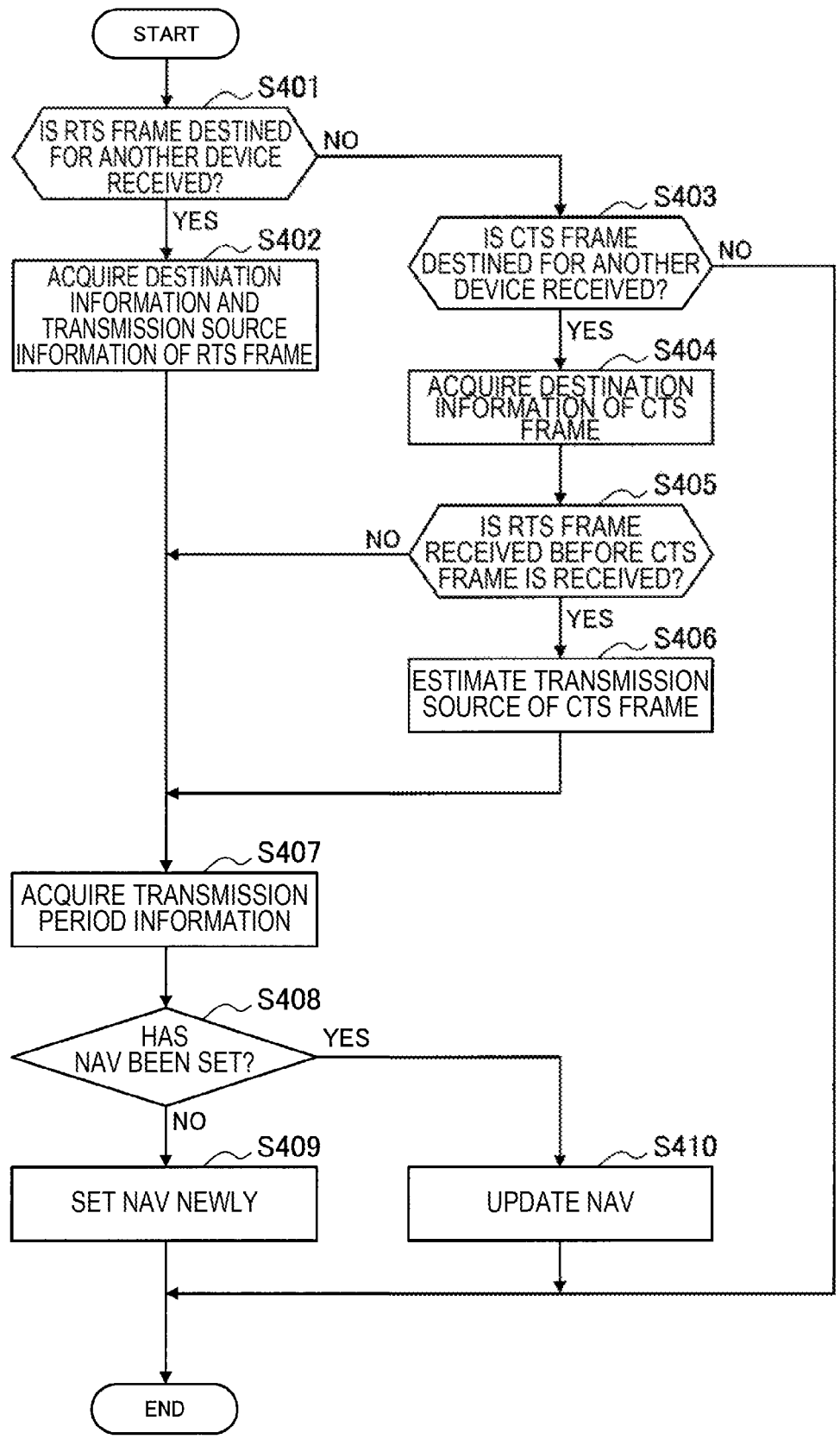
FIG. 18 is a flowchart conceptually illustrating an example of a NAV setting process in a reception device according to one embodiment of the present disclosure.

Next, a process of the reception device 200 will be described with reference to FIGS. 18 and 19. FIG. 18 is a flowchart conceptually illustrating an example of a NAV setting process in the reception device 200 according to one embodiment of the present disclosure.

The reception device 200 determines whether or not the RTS frame destined for another communication device is received (step S401). Specifically, if the RTS frame is received by the wireless communication unit 230, the data processing unit 210 acquires the destination information from the RTS frame, and determines whether or not the communication device indicated by the destination information is another communication device other than the reception device 200.

If it is determined that the RTS frame destined for another communication device is received, the reception device 200 acquires the destination information and the transmission source information of the RTS frame (step S402). Specifically, if it is determined that the destination of the received RTS frame is another communication device, the data processing unit 210 acquires the destination information and the transmission source information from the RTS frame. Then, the data processing unit 210 causes the acquired destination information and the transmission source information to be stored in the storage unit.

Further, if it is determined in step S401 that the RTS frame destined for another communication device is not received, the reception device 200 determines whether or not a CTS frame destined for another communication device is received (step S403). Specifically, if the CTS frame is received by the wireless communication unit 230, the data processing unit 210 acquires the destination information from the CTS frame, and determines whether or not the communication device indicated by the destination information is another communication device other than the reception device 200.

If it is determined that the CTS frame destined for another communication device is received, the reception device 200 acquires the destination information of the CTS frame (step S404). Specifically, if it is determined that the destination of the received CTS frame is another communication device, the data processing unit 210 acquires the destination information from the CTS frame. Then, the data processing unit 210 causes the acquired destination information to be stored in the storage unit.

Then, the reception device 200 determines whether or not the RTS frame is received before the CTS frame is received (step S405). Specifically, the data processing unit 210 determines whether or not the RTS frame is received during a period from a time point at which the CTS frame is received to a time point which goes back by a predetermined time back.

If it is determined that the RTS frame is received before the CTS frame is received, the reception device 200 estimates the transmission source of the CTS frame (step S406). Specifically, if it is determined that the RTS frame is received during a period from a time point at which the CTS frame is received to a time point which goes back by a predetermined time back, the data processing unit 210 estimates that the destination of the RTS frame is the transmission source of the CTS frame. Then, the data processing unit 210 causes the destination information of the RTS frame to be stored in the storage unit as the transmission source information of the CTS fame.

Then, the reception device 200 acquires the transmission period information from the received frame (step S407). Specifically, the data processing unit 210 acquires the transmission period information from the Duration field of the received RTS frame or the CTS frame.

Then, the reception device 200 determines whether or not the NAV is set (step S408). Specifically, the control unit 220 determines whether or not the NAV is already set for the destination information or a pair of destination information and transmission source information acquired from the received RTS frame or the CTS frame.

If it is determined that the NAV is not set, the reception device 200 newly sets the NAV (step S409). Specifically, the control unit 220 newly provides a NAV counter for the acquired destination information or a pair of destination information and transmission source information, and sets a value of the NAV counter on the basis of the acquired transmission period information.

On the other hand, if it is determined that the NAV is already set, the reception device 200 update the NAV (step S410). Specifically, the control unit 220 updates the value of the NAV counter for the acquired destination information or the pair of destination information and transmission source information on the basis of the acquired transmission period information.

Figure 19:
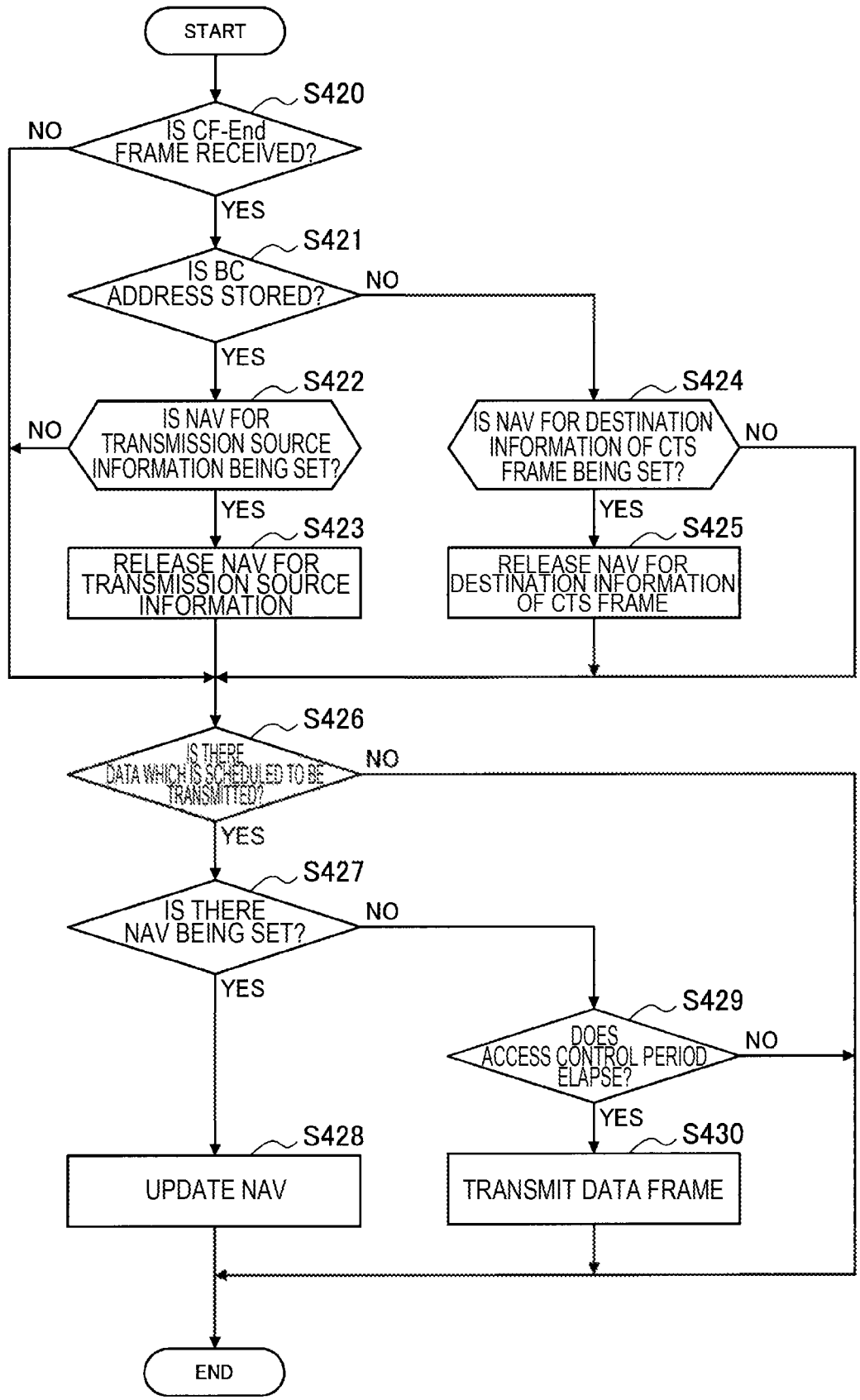
FIG. 19 is a flowchart conceptually illustrating an example of a NAV update process and a NAV release process in a reception device according to one embodiment of the present disclosure.

Further, FIG. 19 is a flowchart conceptually illustrating an example of a NAV update process and a NAV release process in the reception device 200 according to one embodiment of the present disclosure.

The reception device 200 determines whether or not the second CF-End frame is received (step S420). Specifically, the data processing unit 210 determines whether or not the second CF-End frame is received by the wireless communication unit 230.

If it is determined that the second CF-End frame is received, the reception device 200 determines whether or not the broadcast address is stored (step S421). Specifically, if it is determined that the second CF-End frame is received, the data processing unit 210 determines whether or not the broadcast address is stored in the second CF-End frame. Further, the data processing unit 210 may determine whether or not the value of the CF-End type information stored in the CF-End Type field of the second CF-End frame is 0x00.

If it is determined that the broadcast address is stored, the reception device 200 determines whether or not the NAV for the transmission source information of the second CF-End frame is being set (step S422). Specifically, if it is determined that the broadcast address is stored, the data processing unit 210 acquires the BSSID information which is the transmission source information stored in the BSSID (TA) field of the received second CF-End frame. Then, the control unit 220 determines whether or not the NAV counter for the acquired BSSID information is set.

If it is determined that the NAV for the transmission source in formation of the second CF-End frame is being set, the reception device 200 releases the NAV for the transmission source information (step S423). Specifically, if it is determined that the NAV counter for the acquired BSSID information is set, the control unit 220 sets the value of the NAV counter to 0.

Further, if it is determined in step S421 that the broadcast address is not stored, the reception device 200 determines whether or not the NAV for the destination information of the CTS frame stored in the second CF-End frame is being set (step S424). More specifically, the data processing unit 210 acquires the destination information of the CTS frame from the received second CF-End frame. Then the control unit 220 determines whether or not the NAV counter is set for the destination information of the acquired CTS frame.

If it is determined that the NAV for the destination information of the CTS frame is being set, the reception device 200 releases the NAV for the destination information of the CTS frame (step S425). Specifically, the control unit 220 sets the value of the NAV counter for the destination information of the acquired CTS frame to 0.

Then, the reception device 200 determines whether or not there is data winch is scheduled to be transmitted (step S426). Specifically, the control unit 220 determines whether or not there is data stored in the transmission buffer 212.

If it is determined that there is data which is scheduled to be transmitted, the reception device 200 determines whether or not there is a NAV being set (step S427). Specifically, if it is determined that there is data stored in the transmission buffer 212, the control unit 220 determines whether or not there is a NAV counter whose value is not 0.

If it is determined that there is a NAV being set, the reception device 200 updates the NAV each time a predetermined time passes (step S428). Specifically, if it is determined that there is a NAV counter whose value is not 0, the control unit 220 subtracts the value of the NAV counter.

On the other hand, if it is determined that there is no NAV being set, the reception device 200 determines whether or not an access control period elapses (step S429). Specifically, if it is determined that there is no NAV counter whose value is not 0, the control unit 220 stands by until a predetermined period such as a distributed coordination function (DCF) inter frame space (DIFS) elapses.

If it is determined that the access control period elapses, the reception device 200 transmits the data frame (step S430). Specifically, if a predetermined period such as the DISF elapses, the control unit 220 causes the data processing unit 210 to generate the data frame. Then, the wireless communication unit 230 transmits the generated data frame.

<2-5. Operation Examples>

The processes of the transmission device 100 and the reception device 200 according to one embodiment of the present disclosure have been described above. Next, operation examples of the transmission device 100 and the reception device 200 will be described by comparison with operation examples of the transmission device 10 and the reception device 20 according to the related art.

(Operation Example of Communication Device of Related Art)

Figure 20:
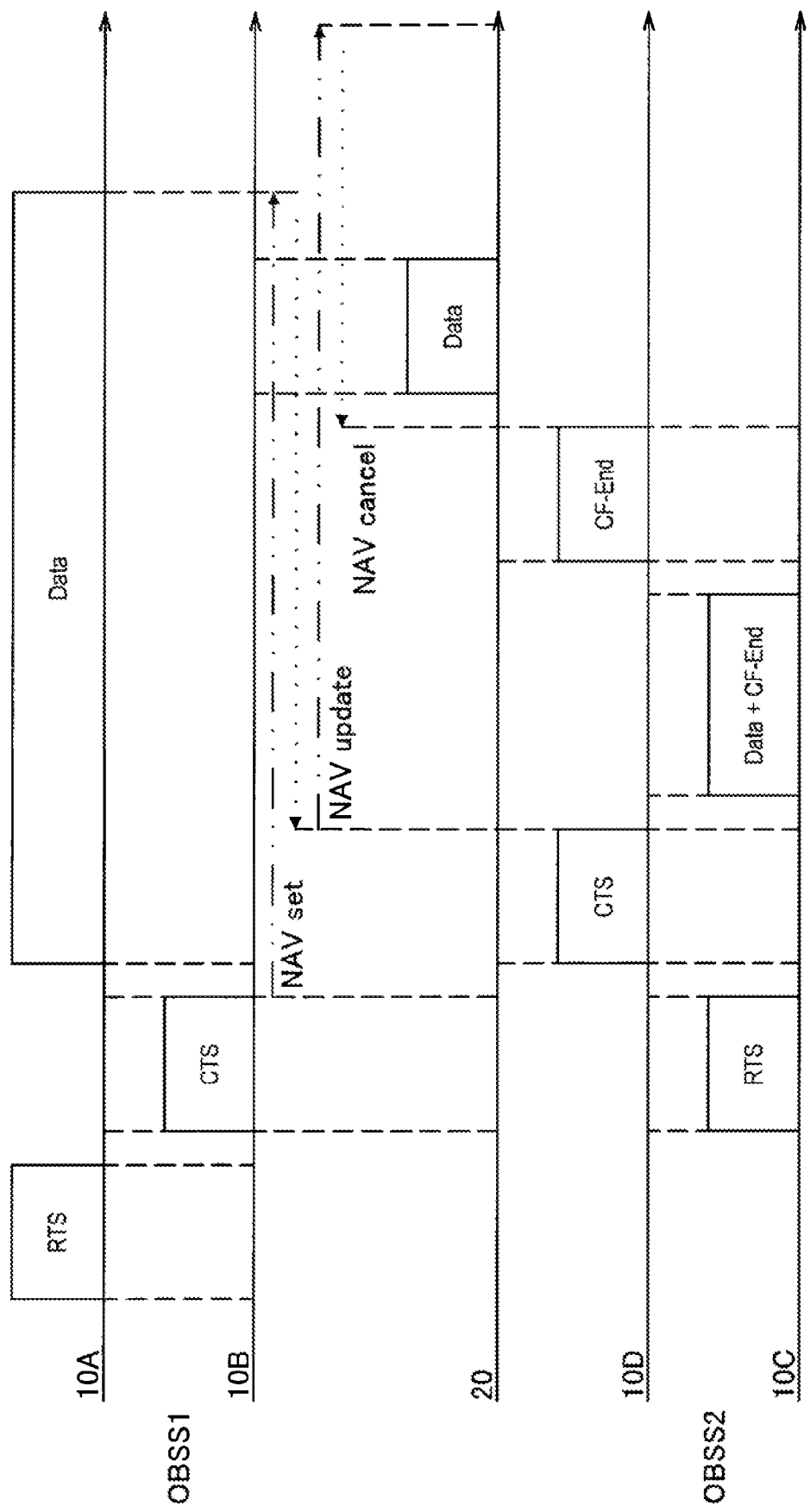
FIG. 20 is a diagram for describing an example of communication between a transmission device and a reception device according to a related art.

First, operation examples of the transmission device 10 and the reception device 20 according to the related art will be described with reference to FIG. 20. FIG. 20 is a diagram for describing an example of communication between the transmission device 10 and the reception device 20 according to the related art. Here, transmission devices 10A and 10B and a reception device 20 belonging to an OBSS 1 and transmission devices 10C and 10D belonging to an OBSS 2 will be described.

In the OBSS 1, the transmission device 10A transmits the RTS frame to the transmission device 10B, and the transmission device 10B which has received the RTS frame transmits the CTS frame to the transmission device 10A. Here, since the reception device 20 receives only the CTS frame, the reception device 20 sets the NAV on the basis of the CTS frame.

Further, in the OBSS 2, the transmission device 10C transmits the RTS frame to the transmission device 10D, and the transmission device 10D which has received the RTS frame transmits the CTS frame to the transmission device 10C. Here, the reception device 20 receives the CTS frame transmitted from the transmission device 10C. Since the NAV for the OBSS is managed with one setting, the reception device 20 updates the NAV on the basis of the CTS frame.

Thereafter, in the OBSS 2, the data frame and the existing CF-End frame are transmitted from the transmission device 10C, and the transmission device 10D which has received the frames transmits the existing CF-End frame. Here, since the reception device 20 receives the existing CF-End frame transmitted from the transmission device 10D, the reception device 20 releases the NAV on the basis of the existing CF-End frame. Then, the reception device 20 transmits the data frame.

However, in the OBSS 1, since the transmission device 10A is transmitting the data frame, a frame collision occurs due to the transmission of the data frame by the reception device 20. As a result, the data transmission between the transmission device 10A and the transmission device 10B is likely to fail.

(Operation Example of Communication Device According to One Embodiment of Present Disclosure)

Figure 21:
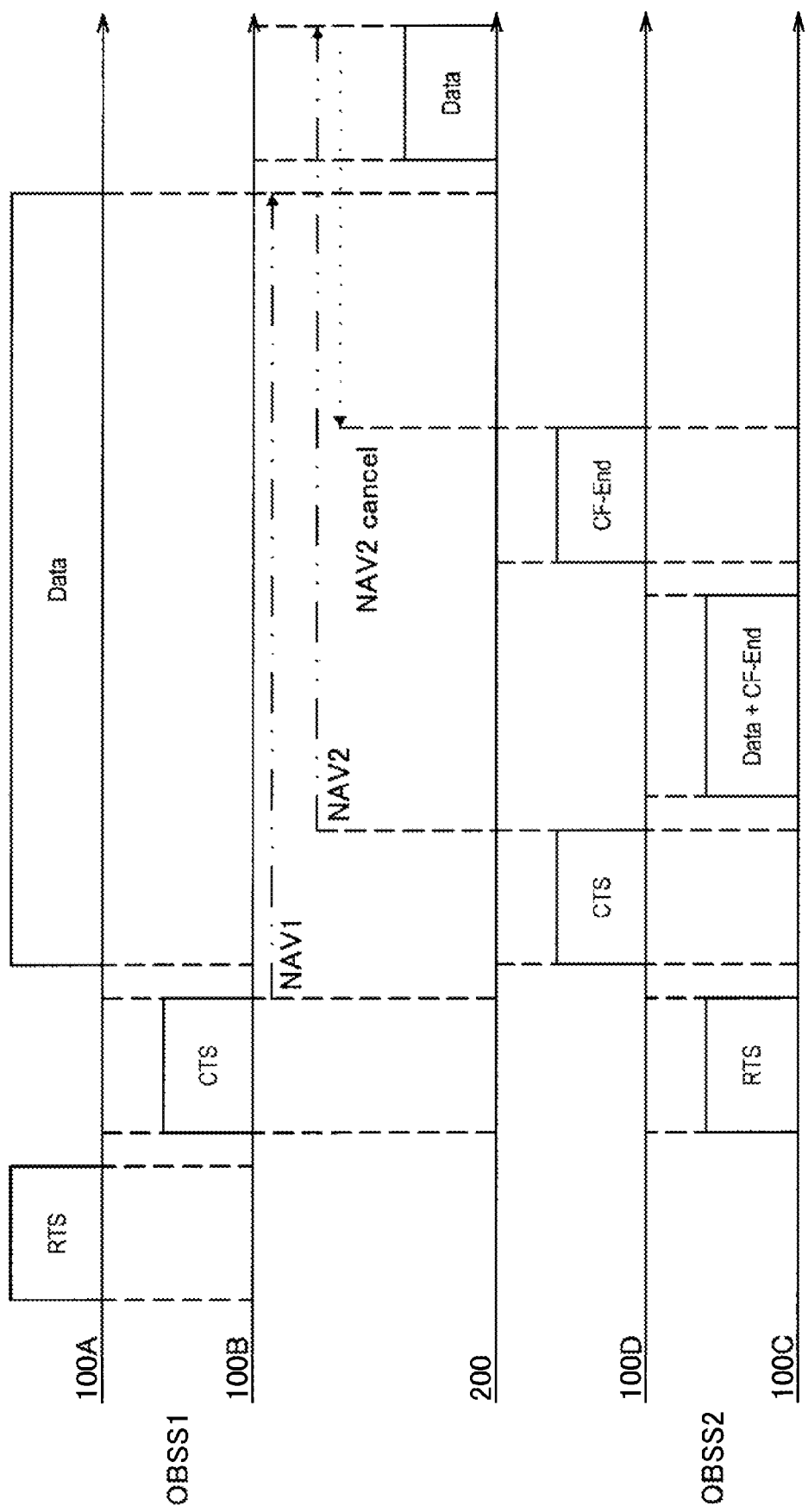
FIG. 21 is a diagram for describing an example of communication between a transmission device and a reception device according to one embodiment of the present disclosure.

Then, an example of communication between the transmission device 100 and the reception device 200 according to one embodiment of the present disclosure will be described with reference to FIG. 21. FIG. 21 is a diagram for describing an example of communication between the transmission device 100 and the reception device 209 according to one embodiment of the present disclosure. Here, transmission devices 100A and 100B and a reception device 200 belonging to an OBSS 1 and transmission devices 100C and 100D belonging to an OBSS 2 will be described.

In the OBSS 1, the transmission device 100A transmits the RTS frame to the transmission device 100B, and the transmission device 100B which has received the RTS frame transmits the CTS frame to the transmission device 100A. Here, in order to receive only the CTS frame transmitted from the transmission device 100B, the reception device 200 sets the destination information of the CTS frame, that is, a NAV1 for the transmission device 100A.

Further, in the OBSS 2, the transmission device 100C transmits the RTS frame to the transmission device 100D, and the transmission device 100D which received the RTS frame transmits the CTS frame to the transmission device 100C. Here, the reception device 200 receives the CTS frame transmitted from the transmission device 100C. In the reception device 200, since the NAV is managed tor each piece of destination information of the CTS frame, the reception device 20 sets the destination information of the CTS frame, that is, a NAV 2 for the transmission device 100C.

Thereafter, in the OBSS 2, the data frame and the second CF-End frame are transmitted from the transmission device 100C, and the transmission device 100D which has received the frames transmits the second CF-End frame. In the second CF-End frame, the destination information of the CTS frame transmitted by the transmission device 100D is stored. Here, in order to receive the second CF-End frame transmitted from the transmission device 100D, the reception deuce 200 releases only the destination information coinciding with the destination information stored in the second CF-End frame, that is, the NAV 2 for the transmission device 100C. On the other hand, since the NAV 1 for the transmission device 100A is not released, the reception device 200 transmits the data frame after the period for the NAV 1 ends.

For this reason, the transmission of the data frame of the transmission device 100A in the OBSS 1 is not disturbed. In other words, it is possible to prevent the occurrence of communication collision. As a result, it is possible to suppress a reduction in communication efficiency between the transmission device 100A and the transmission device 100B.

<2-6. Conclusion of One Embodiment of Present Disclosure>

Thus, according to one embodiment of the present disclosure, the transmission device 100 generates a second frame which has first destination information specifying a destination stored in a first frame which is used for stopping transmission of a frame of a communication device other than the destination and serves as a response to a communication request and is used for releasing the stop of the transmission of the frame caused by the first frame. Then, the transmission deuce 100 transmits the second frame. Further, the reception device 200 receives the second frame having the first destination information and controls the transmission of the frame on the basis of the received second frame.

In the related art, since the BSSID information is not stored in the CTS frame, even though the CF-End frame is received by the communication device that received only the CTS frame, the NAV for the BSSID information stored in the CF-End Frame is unable to be determined. Therefore, in a case in which the NAV is released, communication collision is likely to occur, and in a case, in which the NAV is not released, the communication opportunities are likely to decrease.

On the other hand, according to one embodiment of the present disclosure, the reception device 200 can appropriately release the NAV since the transmission device 300 notifies of the destination information of the CTS frame together with the CF-End. Therefore, it is possible to prevent communication collision while suppressing the reduction in opportunities to access the transmission path.

Further, the first destination information is stored in a region different from the region in which the transmission source information of the second frame is stored. Therefore, it is possible to notify of the destination information of the CTS frame with the second CF-End frame while leaving the transmission source information of the second CF-End frame. Therefore, it is possible to maintain the existing process using the transmission source information, and it is possible to minimize the change amount of the communication process.

Further, the region different from the region in which the transmission source information of the second frame is stored includes a region in which the destination information of the second frame is stored. Here, the broadcast address is stored in the region in which the destination information of the existing CF-End frame is stored. However, if it is known that the CF-End frame is a broadcasted frame, the broadcast address can be omitted. Therefore, it can be said that the region in which the destination information is stored is a redundant region. In this regard, when the destination information of the CTS frame is stored in the region in which the destination information is stored, it is possible to notify of the destination information of the CTS frame in accordance with the existing frame format. Therefore, it is possible to suppress the change amount of the communication process. Further, in a case in which the frame size is maintained, it is possible to suppress an increase in communication volume as well.

Further, the first destination information is stored in a region different from both the region in which the transmission source information of the second frame is stored and the region in which the destination information of the second frame is stored. For this reason, for example, when the destination information of the CTS frame is stored in a region added to the existing frame format, the communication process of the existing CF-End frame can be used without change. Therefore, it is possible to further suppress the change amount of the communication process.

Further, the second frame includes information specifying a type of second frame. Therefore, it is possible to communicate a plurality of CF-End frames depending on a situation. For example, it is possible to select the second CF-End frame in which the CF-End type is 0x01 or the second CF-End frame in which the CF-End type is 0x02 depending on a communication situation.

Further, the information specifying the type of second frame is stored in the region in which the transmission period information of the second frame is stored. Therefore, it is possible to use the frame format of the existing CF-End frame, and it is possible to secure the frame compatibility. For example, in a case in which the CF-End type information is stored in the Duration field as described above, since 0x00 is stored in the corresponding field in the existing CF-End frame, the CF-End type of the existing CF-End frame is specified to be 0x00, and thus it is possible to secure the compatibility with the existing CF-End frame. Therefore, even in a case in which there is a communication device not compatible with the second CF-End frame, the transmission device 100 can transmit the second CF-End frame compatible with the existing CF-End frame by executing the process of the second CF-End frame.

Further, the second frame includes the information specifying the wireless communication network to which the transmission source of the second frame belongs, and the information specifying the wireless communication network is stored in the region in which the transmission source information of the second frame is stored. Therefore, the reception device 200 can acquire the BSSID information as well as the destination information of the CTS frame related to the release of the NAV. Therefore, the reception device 200 an detect the BSS from which the NAV is released without performing a separate process.

Further, the first frame includes the CTS frame, and the second frame includes the CF-End frame. Therefore, it is possible to suppress both the occurrence of communication collision and the decrease in the communication opportunities caused by the release of the NAV by the CF-End frame in the existing RTS/CTS mechanism.

Further, the reception device 200 receives the first frame, and controls the stop of the transmission of the name for each piece of first destination information on the basis of the first destination information included in the received first frame and the first destination information included in the received second frame. Therefore, since the NAV is managed for each piece of destination information of the CTS frame, even in a case in which a plurality of CTS frames having different destinations are received, the NAV can be appropriately released. Therefore, it is possible to prevent the NAV from being erroneously released or the NAV to be released from being left uncontrolled.

Further, the reception device 200 receives the third frame related to the communication request, and controls the stop of the transmission of the frame for each piece of transmission source information in which the transmission source of the third frame included the received third frame is specified or each piece of destination information in which the destination of the third frame is specified. Therefore, the NAV is managed even for RTS frame for each piece of address information as in the CTS frame, and thus the NAV can be released appropriately. Therefore, it is possible to cause the reception device 200 which has received only the RTS frame to prevent communication collision while suppressing the reduction in the communication opportunities.

3. MODIFIED EXAMPLES

One embodiment of the present disclosure has been described above. Further, one embodiment, of the present disclosure is not limited to the above example. First and second modified examples of one embodiment of the present disclosure will be described below.

First Modified Example

As a first modified example of one embodiment of the present disclosure, the second CF-End frame may double as the acknowledge. Specifically, the transmission device 100 transmits a second CF-End+CP-Ack frame having destination information related to the destination of the CTS frame which is an acknowledge target using a second CF-End frame doubling as the acknowledge (hereinafter also referred to as a "second CF-End+CF-Ack frame"). Further, the reception device 200 receives the second CF-End+CF-Ack frame, and controls retransmission of the frame related to the acknowledge by the receive second CF-End+CF-Ack frame on the basis of the destination information of the CTS frame included, in the received second CF-End+CF-Ack frame.

Next, a configuration of the second CF-End+CF-Ack frame will be described with reference to FIGS. 22 and 23. FIG. 22 is a diagram illustrating an example of a configuration of the second CF-End+CF-Ack frame transmitted by the transmission device 100 according to the first modified example of the present disclosure. FIG. 23 is a diagram illustrating another example of a configuration of the second CF-End+CF-Ack frame transmitted by the transmission device 100 according to the first modified example of one embodiment of the present disclosure.

The second CF-End+CF-Ack frame includes information specifying the communication device which is the destination information of the CTS frame and is the acknowledge target for the data frame (hereinafter also referred to as "acknowledge target information"). For example, as illustrated in FIG. 22, the second CF-End+CF-Ack frame has fields such as Frame Control, CF-End Type, ACK RA, BSSID (TA), and FCS. A value such as 0x03 is stored in the CF-End Type field. Further, the acknowledge target information is stored in the ACK RA field.

Further, the second CF-End+CF-Ack frame may include the acknowledge target information stored in another region. For example, as illustrated in FIG. 23, the second CF-End+CF-Ack frame has fields such as frame Control, CF-End Type, RA, BSSID (TA), ACK RA, and FCS. A value such as 0x04 is stored in the CF-End Type field of the second CF-End+CF-Ack frame.

For example, if the data frame is received from the reception device 200, and the data transmission ends, the control unit 120 causes the data processing unit 110 to generate the second CF-End+CF-Ack frame. Then, the wireless communication unit 130 transmits the generated second CF-End+CF-Ack frame.

On the other hand, if the second CF-End+CF-Ack frame is received by the wireless communication unit 230, the data processing unit 210 acquires the acknowledge target information from the second CF-End+CF-Ack frame. Then, the control unit 220 releases the TXOP for the acknowledge target information. Further, the control unit 220 determines that the data frame transmuted before the second CF-End+CF-Ack frame is received is successfully received and stops the retransmission process for the data frame.

As described above, according to the first modified example of one embodiment of the present disclosure, the transmission device 100 transmits the second CF-End+CF-Ack frame having the destination information related to the destination of the CTS frame serving as the target of the acknowledge using the second CF-End+CF-Ack frame. Further, the reception device 200 receives the second CF-End+CF-Ack frame, and controls the retransmission of the frame related in the acknowledge by the received second CF-End+CF-Ack frame on the basis of the destination information of the CTS frame included in the received second CF-End+CF-Ack frame. Here, in a case in which the data frame is transmitted from the reception deuce 200, when the second CF-End frame is transmitted, although it is possible to appropriately release the TXOP, the acknowledge is not notified of. Therefore, the data frame may be retransmitted from the reception device 200 depending on the transmission timing of the Ack frame despite the successful reception of the data frame transmitted from the reception device 200. On the other hand, in accordance with the present modified example, the second CF-End frame doubling as the acknowledge, that is, the second CF-End+CF-Ack frame is transmitted, and thus it is possible to notify both the acknowledge and the release of TXOP at once. Therefore, it is possible to suppress a decrease in communication efficiency by suppressing the possibility of unnecessary retransmission of the data frame.

Second Modified Example

As a second modified example of one embodiment of the present disclosure, the number of first destination information stored in the second CF-End frame may be two or more. Specifically, the transmission deuce 100 transmits the second CF-End+CF-Ack frame having a plurality of pieces of acknowledge target information. A configuration of the CF-End+CF-Ack frame in the present modified example will be described with reference to FIG. 24. FIG. 24 is a diagram illustrating an example of a configuration of the second CF-End+CF-Ack frame transmitted by the transmission device 100 according to the second modified example of one embodiment of the present disclosure.

The second CF-End+CF-Ack frame includes a plurality of pieces of acknowledge target information. For example, as illustrated in FIG. 24, the second CF-End+CF-Ack frame has fields such as Frame Control, CF-End Type, n ACK RAs, BSSID (TA), and FCS. A value such as 0x05 is stored in the CF-End Type field. Further, n pieces of acknowledge target information are stored in n ACK RA fields.

For example, if the data frames are received from a plurality of reception devices 200, and the data transmission ends, the control unit 120 generates the acknowledge target information for the reception device 200 which has transmitted the data frame in which the data frame has been successfully received among a plurality of reception devices 200. Then, the control unit 120 causes the data processing unit 110 to generate the second CF-End+CF-Ack frame including a plurality of pieces of generated acknowledge target information. Then, the wireless communication unit 130 transmits the generated second CF-End+CF-Ack frame.

On the other hand, if the second CF-End+CF-Ack frame is received by the wireless communication unit 230, the data processing unit 210 acquires a plurality of pieces of acknowledge target information from the second CF-End+CF-Ack frame. Then, in a case in which the communication device indicated by one of a plurality of pieces of acknowledge target information is the reception device 200, the control unit 220 releases the TXOP. Further, the control unit 220 determines that the data frame transmitted before the second CF-End+CF-Ack frame is received is successfully received and stops the retransmission process for the data frame.

Figure 25:
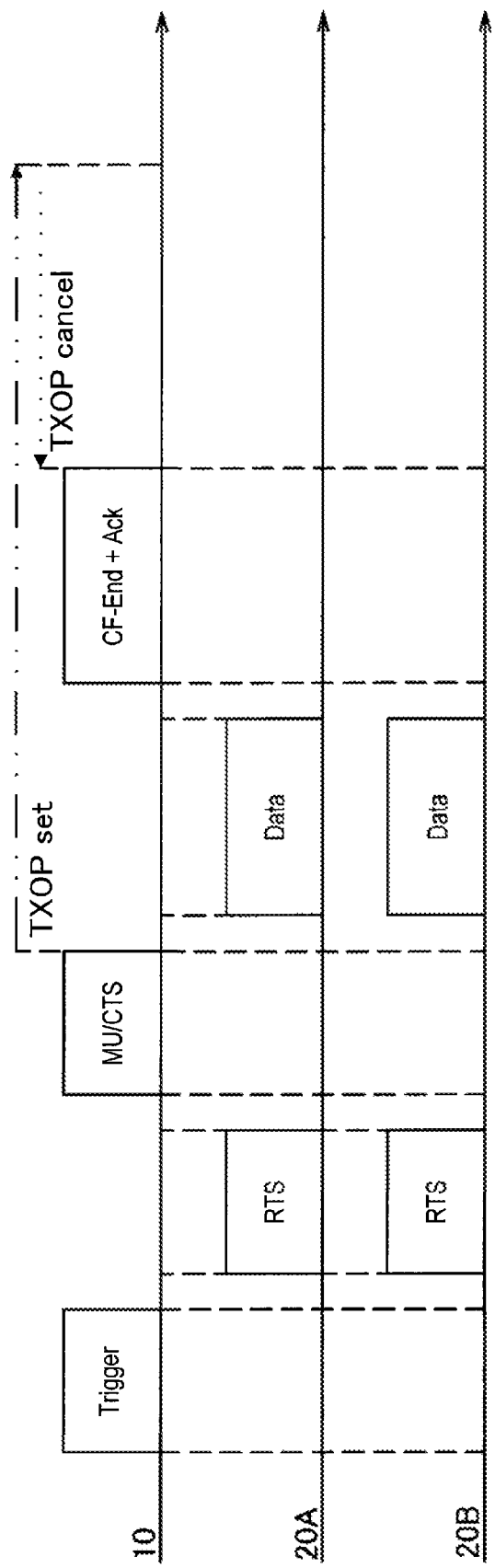
FIG. 25 is a diagram for describing an example of communication between a transmission device and a reception device according to a related art.
Figure 26:
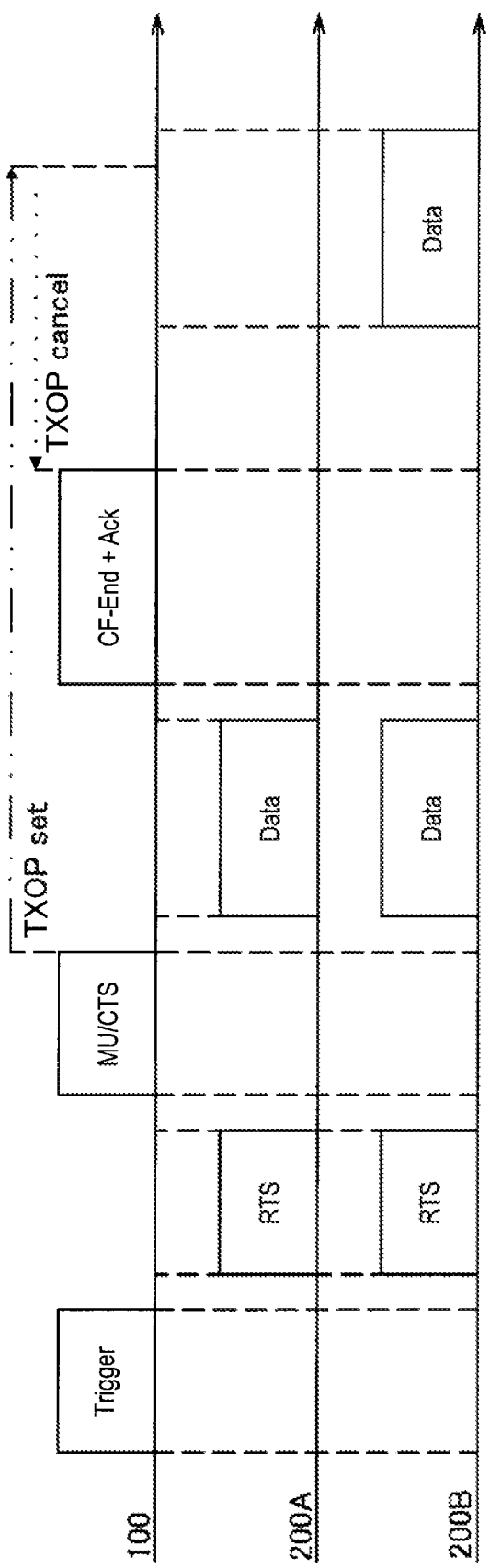
FIG. 26 is a diagram for describing an example of communication between a transmission device and a reception device according to the second modified example of one embodiment of the present disclosure.

Further, an operation example of the transmission device 100 and the reception device 200 according to the present modified example will be described with reference to FIGS. 25 and 26 by comparison with an operation example of the transmission device 10 and reception device 20 according to the related art. FIG. 25 is a diagram for describing an example of communication between the transmission device 10 and the reception device 20 according to the related art. FIG. 26 is a diagram for describing an example of communication between the transmission device 100 and the reception device 200 according to the second modified example of one embodiment of the present disclosure.

(Operation Example of Communication Device of Related Art)

First, an operation example of the transmission device 10 and the reception device 20 according to the related art will be described with reference to FIG. 25. Here, a case in which one transmission device 10 communicates with the reception device 20A and the reception device 20B will be described.

The transmission device 10 transmits a trigger frame for multiple communication. The reception devices 20A and 20B which have received the trigger frame transmit the RTS frame using communication resources designated by the trigger frame. Therefore, the RTS frames are multiplexed. The transmission device 10 which has received the multiplexed RTS frame transmits the CTS frame whose destination is the reception devices 20A and 20B. Each of the reception devices 20A and 20B which have received the CTS frame sets the TXOP. Further, communication devices other than the reception devices 20A and 20B set the NAV.

Thereafter, the data frame is transmitted from each of the reception devices 20A and 20B. The data frames may be multiplexed. Here, it is assumed that the data frame transmitted from the reception device 20B out of the two data frames is not received by the transmission device 10. In this case, the transmission device 10 which has received only the data frame transmitted from the reception device 20A transmits the existing CF-End+CF-Ack frame if the data transmission ends within the TXOP period.

However, since the existing CF-End+CF-Ack frame has the same configuration as the existing CF-End frame, the broadcast address is stored as the destination information. Therefore, it is unable to be determined which of the reception devices 20A and 20B the destinations of the existing CF-End+CF-Ack frames received by the reception devices 20A and 20B are. Therefore, in a case in winch the frame retransmission process is stopped uniformly on the basis of the reception of the existing CF-End+CF-Ack frame, the data frame of the reception device 20B which has nut been successfully received is not transmitted to the transmission device 10 without being retransmitted.

(Operation Example of Communication Device According to One Embodiment of Present Disclosure)

Next, an example of communication between the transmission device 100 and the reception device 200 according to one embodiment of the present disclosure will be described with reference to FIG. 26. Here, a case in which one transmission device 100 communicates with the reception device 200A and the reception device 200B will be described.

Similarly to the example of FIG. 25, the transmission device 100 transmits the trigger frame for multiple communication. The reception devices 200A and 200B which have receded the trigger frame transmit the RTS frame using communication resources designated by the trigger frame. The transmission device 100 which has received the multiplexed RTS frame transmits the CTS frame whose destinations are the reception devices 200A and 200B. Each of the reception devices 200A and 200B which have received the CTS frame sets the TXOP. Further, communication devices other than the reception devices 200A and 200B set the NAV.

Thereafter, the data frame is transmitted from each of the reception devices 200A and 200B. Here, it is assumed that the data frame transmitted from the reception device 200B out of the two data frames is not received by the transmission device 100. In this case, if the data transmission ends within the TXOP period, the transmission device 100 which has received only the data frame transmitted from the reception device 200A transmits the second CF-End+CF-Ack frame having the acknowledge target information for the reception device 200A.

Therefore, if the second CF-End+CF-Ack frame is received, the reception device 20 A does not execute the retransmission process for the transmitted data frame. On the other hand, since the reception device 20B is not an acknowledge target related to the second CF-End+CF-Ack frame, the reception device 20B executes the retransmission process for the transmitted data frame. As a result, the data frames is retransmitted and received by the transmission device 10.

Further, in the example of FIGS. 25 and 26, the example in which the RTS frame and the data frame are multiplexed to be transmitted at the same timing has been described, but the transmission timings of the RTS frame and the data frame may be different between the reception devices 200.

As described above, according to the second modified example of one embodiment of the present disclosure, the second CF-End frame includes the destination information of a plurality of CTS frames. Therefore, a plurality of reception devices 200 can be set as the target of the second CF-End frame. Accordingly, it is possible to control a plurality of NAVs or TXOPs by one frame, and it is possible to perform communication more efficiently as compared with the case in which the second CF-End frame is transmitted for each of a plurality of NAVs or TXOPs. In particular, according to the second CF-End+CF-Ack frame including a plurality of pieces of acknowledge target information, the acknowledge target can be designated from among a plurality of reception devices 200. Accordingly, it is possible to appropriately retransmit the frame to the reception device 200.

Further, in the above example, the example in which the second CF-End frame is the second CF-End+Ack frame has been described but the destination information of a plurality of CTS frames may be included in the normal second CF-End frame which does not double as the acknowledge.

4. APPLICATION EXAMPLE

The technology according to the present disclosure can be applied to various products. For example, the reception device 200 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. In addition, the reception device 200 may be realized as terminals that perform machine to machine (M2M) communication (also referred to as machine type communication (MTC) terminals) such as smart meters, vending machines, remotely controlled monitoring devices, or point of sale (POS) terminals. Furthermore, the reception device 200 may be wireless communication modules mounted in such terminals (for example, integrated circuit modules configured by one die).

On the other hand, for example, the transmission device 100 may be realized as a wireless LAN access point (also referred to as a wireless base station) which has a router function or does not have a router function. The transmission device 100 may be realized as a mobile wireless LAN router. The transmission device 100 may also be a wireless communication module (for example, an integrated circuit module configured with one die) mounted on such devices.

[4-1. First Application Example]

Figure 27:
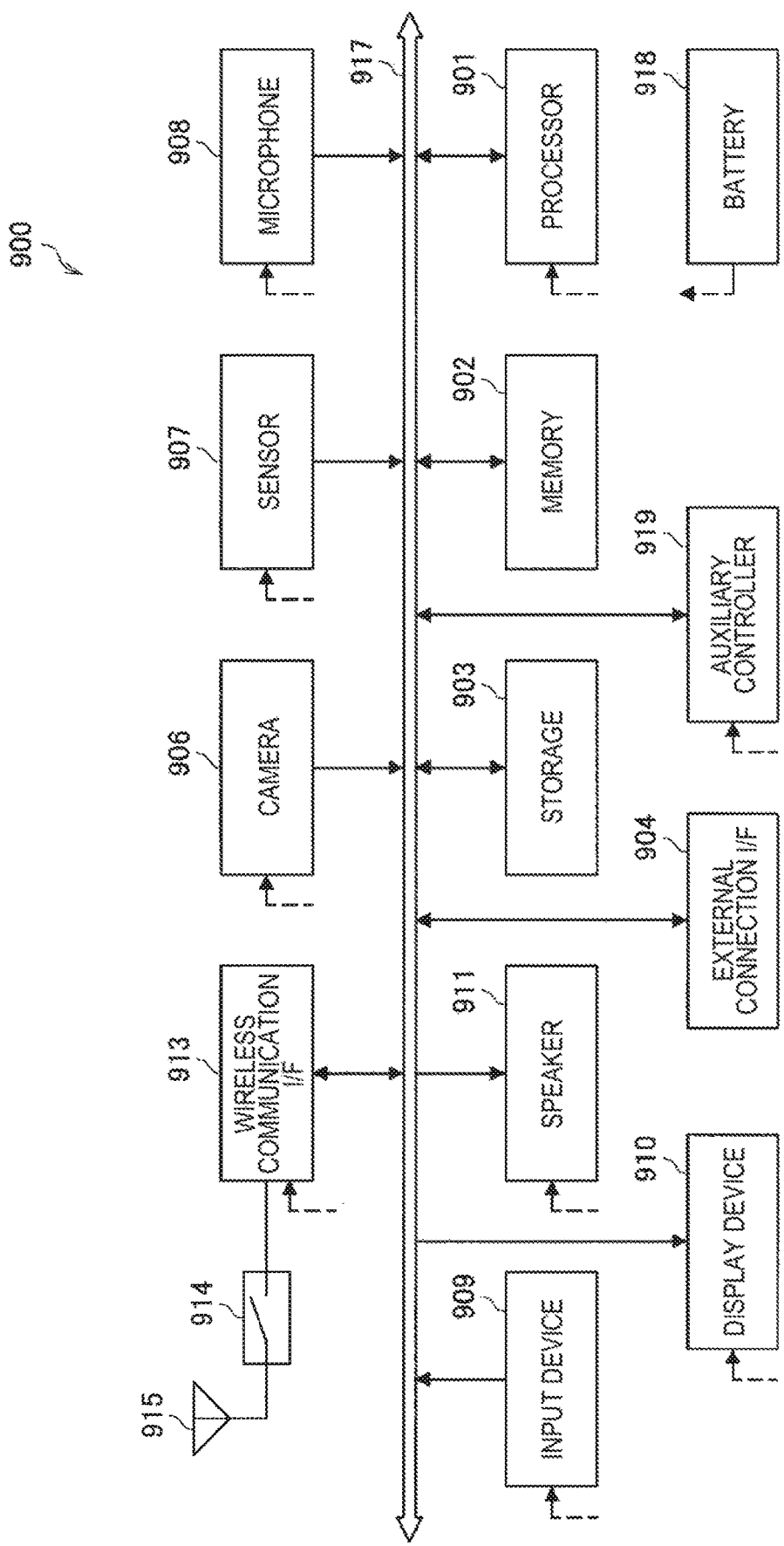
FIG. 27 is a block diagram illustrating an example of a schematic configuration of a smart phone.

FIG. 27 is a block diagram illustrating an example of a schematic configuration of a smart phone 900 to which the technology of the present disclosure can be applied. The smartphone 900 includes a processor 901, a memory 902, a storage 903, an external connection interface 904, a camera 906, a sensor 907, a smartphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The external connection interlace 904 is an interface for connecting an externally attachable device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to establish wireless communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals through the wireless communication interface 913.

Note that the smartphone 900 may include a plurality of antennas (for example, antennas for a wireless LAN or antennas for a proximity wireless communication scheme, or the like), without being limited to the example of FIG. 27. In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 27 via power supply lines partially indicated by dashed lines in the drawing. The auxiliary controller 919 causes, for example, necessary minimum functions of the smartphone 900 to be operated in a sleep mode.

In the smartphone 900 illustrated in FIG. 27, the data processing unit 210, the control unit 220, and the wireless communication unit 230 described above with reference to FIG. 13 may be implemented in the wireless communication interface 913. Further, at least some of the functions may be implemented in the processor 901 or the auxiliary controller 919. For example, the data processing unit 210 acquires the destination information of the CTS frame from the second CF-End frame received by the wireless communication unit 230. The control unit 220 manages the NAV for each piece of destination information of the CTS frame and releases the NAV for the destination information of the acquired CTS frame. Thus, it is possible to suppress a possibility of a NAV being erroneously released and release an appropriate NAV. Therefore, in communication performed by the smartphone 900, it is possible to prevent communication collision while suppressing the decrease in the communication opportunities.

Note that the smartphone 900 may operate as a wireless access point (software AP) as the processor 901 executes the function of an access point at an application level. In addition, the wireless communication interface 913 may have the function of a wireless access point.

[4-2. Second Application Example]

Figure 28:
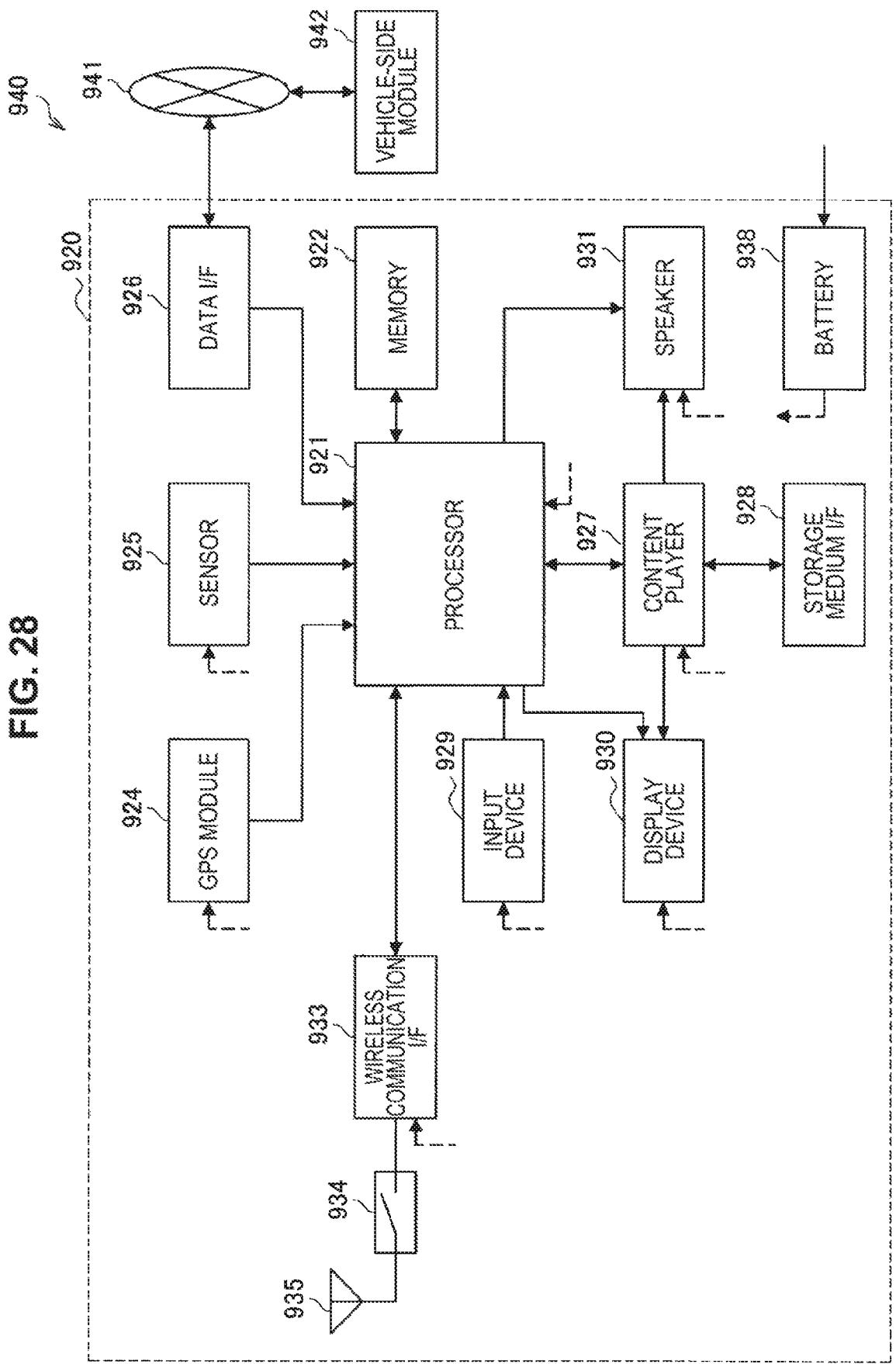
FIG. 28 is a block diagram illustrating an example of a schematic configuration of a car navigation device.

FIG. 28 is a block diagram illustrating an example of a schematic configuration of a car navigation device 920 to which the technology of the present disclosure can be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude and altitude) using GPS signals received from a CPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, 11ad, and the like to execute wireless communication. The wireless communication interface 933 can communicate with another device via a wireless LAN access point in the infrastructure mode. In addition, the wireless communication interface 933 can directly communicate with another device in a direct communication node such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna has a single or a plurality of antenna elements and is used for transmission and reception of wireless signals from and to the wireless communication interface 933.

Note that the car navigation device 920 may include a plurality of antennas, without being limited to the example of FIG. 28. In this case, the antenna switch 934 may be omitted from the configuration of the car navigation device 920.

The battery 938 supplies electric power to each of the blocks of the car navigation device 920 illustrated in FIG. 28 via power supply lines partially indicated by dashed lines in the drawing. In addition, the battery 938 accumulates electric power supplied from the vehicle side.

In the car navigation device 920 illustrated in FIG. 28, the data processing unit 210, the control unit 220, and the wireless communication unit 230 described above with reference to FIG. 13 may be implemented in the wireless communication interface 913. Further, at least some of the functions may be implemented in the processor 921. For example, the data processing unit 210 acquires the destination information of the CTS frame from the second CF-End frame received by the wireless communication unit 230. The control unit 220 manages the NAV for each piece of destination information of the CTS frame and releases the NAV for the destination information of the acquired CTS frame. Thus, it is possible to suppress a possibility of a NAV being erroneously released and release an appropriate NAV. Therefore, in communication performed by the car navigation device 920, it is possible to prevent communication collision while suppressing the decrease in the communication opportunities.

Further, the wireless communication interface 933 may operate as the above-described transmission device 100 and may provide a wireless connection to a terminal carried by the user riding in the vehicle. At this time, for example, in a case in which the data transmission ends before the TXOP period ends, the control unit 120 causes the data processing unit 110 to generate the second CF-End frame having the destination information of the CTS frame. Then, the wireless communication unit 130 transmits the generated second CF-End frame. Thus, the NAV or the TXOP to be released can be designated. Accordingly, it is possible to cause the terminal communicating with the car navigation device 920 to appropriately release the NAV, and it is possible to prevent communication collision while suppressing the decrease in the communication opportunities.

Further, the technology of the present disclosure may be realized as an in-vehicle system (or a vehicle) 940 including one or more blocks of the above-described car navigation device 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

[4-3. Third Application Example]

Figure 29:
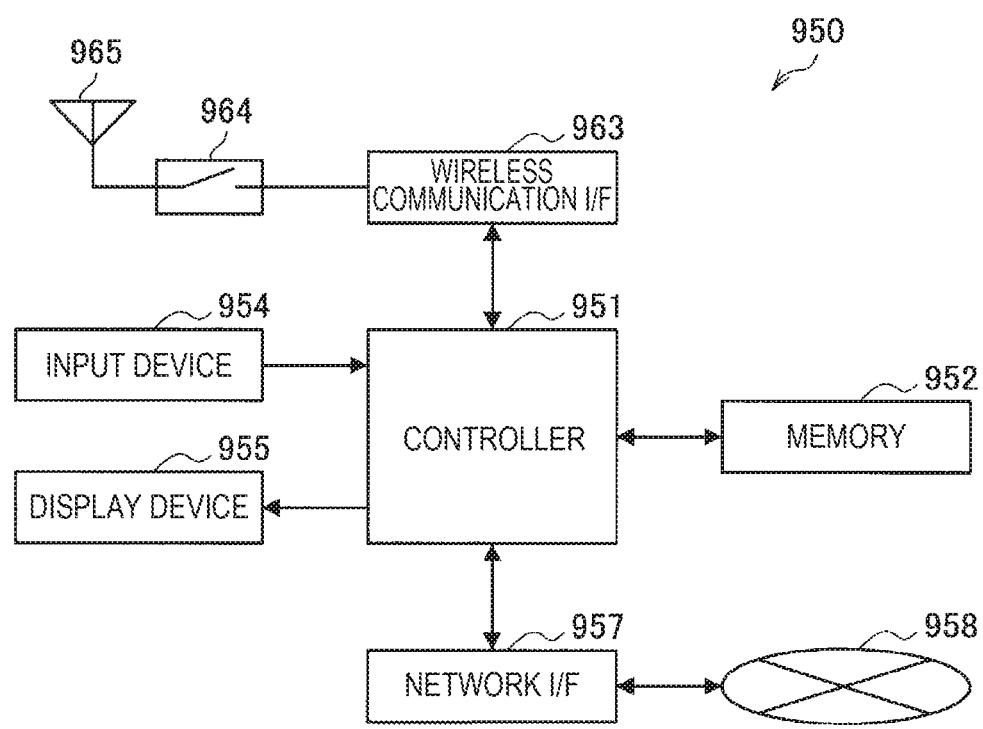
FIG. 29 is a block diagram illustrating an example of a schematic configuration of a wireless access point.

FIG. 29 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation routing, encryption a fire wall, and log management) of the Internet Protocol (IP) layer and higher layers of the wireless access point 950. The memory 952 includes RAM and ROM and stores a program executed by the controller and various kinds of control data (for example a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11g, 11n, 11ac, 11ad, and the like to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point illustrated in FIG. 29, the data processing unit 110, the control unit 120, and the wireless communication unit 130 described above with reference to FIG. 13 may be realized by the wireless communication interface 963. In addition, at least a part of these functions may be implemented by the controller 951. For example, in a case in which the data transmission ends before the TXOP period ends, the control unit 120 causes the data processing unit 110 to generate the second CF-End frame having the destination information of the CTS frame. Then, the wireless communication unit 130 transmits the generated second CF-End frame. Thus, the NAV or the TXOP to be released can be designated. Accordingly, it is possible to cause the terminal communicating with the wireless access point 950 to appropriately release the NAV, and it is possible to present communication collision while suppressing the decrease in the communication opportunities.

5. CONCLUSION

As described above, according to one embodiment of the present disclosure, the transmission device 100 notifies of the destination information of the CTS frame together with the CF-End, and thus the reception device 200 can appropriately release the NAV. Therefore, it is possible to prevent communication collision while suppressing the reduction in opportunities to access the transmission path.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, the transmission device 100 transfers the CF-End frame in response to the reception of the CF-End frame, but the present technology is not limited to this example. For example, the reception device 200 may transfer the CF-End frame m response to reception of the CF-End frame. As a result, it is possible to cause the communication device which is unable to directly receive the CF-End frame from the transmission device 100 to receive the CF-End frame.

Further, in the above embodiment, the example in which the BSSID information, that is, the destination information of the RTS frame is used in the control of the NAV related to the RTS frame has been described, but the control of the NAV related to the RTS frame may be performed by using the transmission source information of the RTS frame. Specifically, the reception device 200 controls the stop of the transmission of the frame for each piece of transmission source information of the RTS frame on the basis of the transmission source information in which the transmission source of the RTS frame included in the received RTS frame is specified and the destination information of the CTS frame included in the received second CF-End frame. For example, if the second CF-End frame is received before the set NAV period ends, the data processing taut 210 acquires the destination information of the CTS frame from the second CF-End frame. The control unit 220 determines whether or not the destination indicated by the destination information of the acquired CTS frame coincides with the transmission source indicated by the transmission source information of the RTS frame stored in the storage unit. If it is determined that the destination of the CTS frame coincides with the transmission source of the RTS frame, the control unit 220 releases the NAV associated with the transmission source information of the RTS frame.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, steps illustrated in the flowcharts of the above embodiment include not only processes which are chronologically performed in accordance with the described order but also processes which are not necessarily chronologically performed but performed m parallel or individually as well. Further, it is needless to say that even in steps which are processed chronologically, the order can be appropriately changed depending on circumstances.

In addition, it is also possible to produce a computer program for causing hardware incorporated in communication devices 100 and 200 to exhibit functions equivalent to those of the respective logic configurations of the aforementioned the communication devices 100 and 200. In addition, a storage medium that stores the computer program therein is also provided.

Additionally, the present technology may also be configured as below.

(1)

A communication device, including:

a processing unit configured to generate a second ban so used for releasing a stop of transmission of a frame caused by a first frame, the second frame including first destination information specifying a destination stored in the first frame, the first frame being used for stopping transmission of frames of communication devices other than the destination and serving as a response to a communication request; and a wireless communication unit configured to transmit the second frame.

(2)

The communication device according to (1), in which the first destination information is stored in a region different from a region in which transmission source information of the second frame is stored.

(3)

The communication device according to (2), in which the region different from the region in which the transmission source information of the second frame is stored includes a region in which destination information of the second frame is stored.

(4)

The communication device according to (1), in which the first destination information is stored in a region different from both of a region in which transmission sots roe information of the second frame is stored and a region in which destination information of the second frame is stored.

(5)

The communication device according to any one of (1) to (4), in which the second frame includes a frame doubling as an acknowledge, and the first destination information included in the second frame includes the first destination information related to a destination of the first frame which is a target of an acknowledge using the second frame.

(6)

The communication device according to any one of (1) to (5), in which the second frame includes a plurality of pieces of first destination information.

(7)

The communication device according to any one of (1) to (6), in which the second frame includes information specifying a type of the second frame.

(8)

The communication device according to (7), in which the information specifying the type of the second frame is stored in a region in which transmission period information of the second frame is stored.

(9)

The communication device according to any one of (1) to (8), in which the second frame includes information specifying a wireless communication network to which a transmission source of the second frame belongs, and the information specifying the wireless communication network is stored in a region in which transmission source information of the second frame is stored.

(10)

The communication device according to any one of (1) to (9), in which the first frame includes a clear to send (CTS) frame, and the second frame includes a contention free (CF)-end frame.

(11)

A communication device, including:

a wireless communication unit configured to receive a second frame used for releasing a stop of transmission of a frame caused by a first frame, the second frame including fast destination information specifying a destination stored in the first frame, the first frame being used for stopping transmission of frames of communication devices other than the destination and serving as a response to a communication request; and a control unit configured to control transmission of a frame on a basis of the second frame received by the wireless communication unit.

(12)

The communication device according to (11), in which the wireless communication unit receives the first frame, and the control unit controls the stop of the transmission of the frame for each piece of first destination information on a basis of the first destination information included in the received first frame and the first destination information included in the received second frame.

(13)

The communication device according to (11) or (12), in which the second frame includes a frame doubling as an acknowledge, and the control unit controls retransmission of a frame related to the acknowledge by the second frame on a basis of the first destination information included in the second frame.

(14)

The communication device according to any one of (11) to (13), in which the wireless communication unit receives a third frame related to the communication request, and the control unit controls the stop of the transmission of the frame for each piece of transmission source information in which a transmission source of the third frame included in the received third frame is specified or destination information in which a destination of the third frame is specified.

(15)

A communication method, including:

generating a second frame used for releasing a stop of transmission of a frame caused by a first frame using a processor, the second frame including first destination information specifying a destination stored in the first frame, the first frame being used for stopping transmission of frames of communication devices other than the destination and serving as a response to a communication request; and transmitting the second frame.

(16)

A communication method, including:

receiving a second frame used for releasing a stop of transmission of a frame caused by a first frame using a processor the second frame including first destination information specifying a destination stored in the first frame, the first frame being used for stopping transmission of frames of communication devices other than the destination and serving as a response to a communication request; and controlling transmission of a frame on a basis of the received second frame.

(17)

A program causing a computer to implement:

a processing function of generating a second frame used for releasing a stop of transmission of a frame caused by a first frame, the second frame including first destination information specifying a destination stored in the first frame, the first frame being used for stopping transmission of frames of communication devices other than the destination and serving as a response to a communication request; and a wireless communication function of transmitting the second frame.

(18)

A program causing a computer to implement:

a wireless communication function of receiving a second frame used for releasing a stop of transmission of a frame caused by a first frame, the second frame including first destination information specifying a destination stored in the first frame, the first frame being used for stopping transmission of frames of communication devices other than the destination and serving as a response to a communication request; and a control function of controlling transmission of a frame on a basis of the second frame received by the wireless communication function.

REFERENCE SIGNS LIST

100 transmission device, AP
110, 210 data processing unit
120, 220 control unit
130, 230 wireless communication unit
200 reception device, STA

The invention claimed is:

1. A communication device, comprising:
a processing circuitry configured to generate a second frame used for releasing a stop of transmission of a frame caused by a first frame, the second frame including first destination information which is destination information stored in the first frame, the first frame being used for stopping transmission of frames of communication devices other than the destination and serving as a response to a communication request;
a wireless communication interface configured to transmit the second frame.

2. The communication device according to claim 1, wherein the first destination information is stored in a region different from a region in which the transmission source information of the second frame is stored.

3. The communication device according to claim 2, wherein the different region from the region in which the transmission source information of the second frame is stored includes a region in which destination information of the second frame is stored.

4. The communication device according to claim 1, wherein the first destination information is stored in a region different from both of a region in which transmission source information of the second frame is stored and a region in which destination information of the second frame is stored.

5. The communication device according to claim 1, wherein the second frame includes a frame doubling as an acknowledge, and
the first destination information included in the second frame includes the first destination information related to a destination of the first frame which is a target of an acknowledge using the second frame.

6. The communication device according to claim 1, wherein the second frame includes a plurality of pieces of first destination information.

7. The communication device according to claim 1, wherein the second frame includes information specifying a type of the second frame.

8. The communication device according to claim 7, wherein the information specifying the type of the second frame is stored in a region in which transmission period information of the second frame is stored.

9. The communication device according to claim 1, wherein the second frame includes information specifying a wireless communication network to which a transmission source of the second frame belongs, and
the information specifying the wireless communication network is stored in a region in which transmission source information of the second frame is stored.

10. The communication device according to claim 1, wherein the first frame includes a clear to send (CTS) frame, and
the second frame includes a contention free (CF)-end frame.

11. A communication device, comprising:
a wireless communication interface configured to receive a second frame used for releasing a stop of transmission of a frame caused by a first frame, the second frame including first destination information which is destination information stored in a first frame, the first frame being used for stopping transmission of frames of communication devices other than the destination and serving as a response to a communication request, and
a control circuitry configured to control transmission of a frame on a basis of the second frame received by the wireless communication interface.

12. The communication device according to claim 11, wherein the wireless communication interface receives the first frame, and
the control circuitry controls the stop of the transmission of the frame for each piece of first destination information on a basis of the first destination information included in the received first frame and the first destination information included in the received second frame.

13. The communication device according to claim 11, wherein the second frame includes a frame doubling as an acknowledge, and
the control circuitry controls retransmission of a frame elated to the acknowledge by the second frame on a basis of the first destination information included in the second frame.

14. The communication device according to claim 11, wherein the wireless communication interface receives a third frame related to the communication request, and
the control circuitry controls the stop of the transmission of the frame for each piece of transmission source information in which a transmission source of the third frame included in the received third frame is specified or destination information in which a destination of the third frame is specified.

15. A communication method, comprising:
generating a second frame used for releasing a stop of transmission of a frame caused by a first frame using a processor, the second frame including first destination information which is destination information stored in the first frame, the first frame being used for stopping transmission of frames of communication devices other than the destination and serving as a response to a communication request; and
transmitting the second frame.

* * * * *